(12) United States Patent
Yang et al.

(10) Patent No.: US 11,202,112 B2
(45) Date of Patent: Dec. 14, 2021

(54) RECEIVER AND PLP PROCESSING METHOD THEREFOR

(71) Applicant: SAMSUNG ELECTRONICS CO., LTD., Suwon-si (KR)

(72) Inventors: Hyun-koo Yang, Seoul (KR); Young-ho Oh, Suwon-si (KR); Hak-ju Lee, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 673 days.

(21) Appl. No.: 16/076,503

(22) PCT Filed: Mar. 3, 2017

(86) PCT No.: PCT/KR2017/002330
§ 371 (c)(1),
(2) Date: Aug. 8, 2018

(87) PCT Pub. No.: WO2017/150937
PCT Pub. Date: Sep. 8, 2017

(65) Prior Publication Data
US 2021/0195253 A1 Jun. 24, 2021

Related U.S. Application Data

(60) Provisional application No. 62/303,517, filed on Mar. 4, 2016.

(51) Int. Cl.
*H04N 21/236* (2011.01)
*H04N 21/434* (2011.01)

(52) U.S. Cl.
CPC ..... *H04N 21/236* (2013.01); *H04N 21/23605* (2013.01); *H04N 21/434* (2013.01); *H04N 21/4343* (2013.01)

(58) Field of Classification Search
CPC .......... H04H 4/00; H04H 40/00; H04H 20/18; H04H 60/40; H04H 60/82; H04N 5/455;
(Continued)

(56) References Cited

U.S. PATENT DOCUMENTS

| | | | |
|---|---|---|---|
| 8,107,422 B2 | 1/2012 | Hsu | |
| 8,498,262 B2* | 7/2013 | Vesma | H04H 20/426 370/330 |

(Continued)

FOREIGN PATENT DOCUMENTS

| | | |
|---|---|---|
| CN | 101562502 A | 10/2009 |
| CN | 101909176 A | 12/2010 |

(Continued)

OTHER PUBLICATIONS

Communication dated Oct. 23, 2020, issued by the State Intellectual Property Office of P.R. China in counterpart Chinese Application No. 201780013210.6.

(Continued)

*Primary Examiner* — Man U Phan
(74) *Attorney, Agent, or Firm* — Sughrue Mion, PLLC

(57) ABSTRACT

A receiver is disclosed. The present receiver comprises: a reception unit for receiving, through a channel, a frame in which an LLS for each broadcast service is included in different PLPs; and a signal processing unit for calculating the size of a memory required to time-deinterleave the PLPs including the LLS, and for processing the PLPs including the LLS, on the basis of the calculated size of the memory.

13 Claims, 13 Drawing Sheets

(58) Field of Classification Search
CPC .............. H04N 7/24; H04N 5/44; H04N 7/26; H04N 21/4382; H04N 21/4383; H04N 21/6112; H04N 7/015; H04N 21/2343; H04N 21/236; H04N 21/2381; H04N 21/234; H04N 21/2368; H04N 21/242; H04N 21/4347; H04N 21/64322; H04L 5/00; H04L 5/003; H04L 1/0044; H04L 1/0065; H04L 1/0071; H04L 1/0072; H04L 1/0075; H04L 27/28; H04L 27/3405; H04L 1/0057; H04L 1/0068; H04L 1/08; H04L 27/2613; H04L 5/0048; H04L 29/0627; H04L 41/0246; H04L 65/4076; H04L 65/607; H04W 28/18; H04W 52/02
USPC .......................................................... 370/474
See application file for complete search history.

(56) References Cited

U.S. PATENT DOCUMENTS

| | | | |
|---|---|---|---|
| 8,565,265 B2 * | 10/2013 | Lee | ................ H04L 5/0053 370/473 |
| 8,959,554 B2 * | 2/2015 | Hwang | .............. H04N 21/2362 725/62 |
| 9,167,281 B2 | 10/2015 | Petrov et al. | |
| 9,210,022 B2 * | 12/2015 | Baek | ...................... H04H 20/72 |
| 9,414,099 B2 | 8/2016 | Herrmann et al. | |
| 9,571,323 B2 * | 2/2017 | Kim | ................. H03M 13/2906 |
| 9,584,238 B2 * | 2/2017 | Vare | ..................... H04L 65/4076 |
| 9,584,261 B2 * | 2/2017 | Baek | ...................... H04H 20/72 |
| 9,838,748 B2 * | 12/2017 | Yang | .................. H04N 21/6112 |
| 9,854,279 B2 | 12/2017 | Petrov et al. | |
| 9,948,417 B2 | 4/2018 | Kwon et al. | |
| 10,200,513 B2 * | 2/2019 | Kwak | .................... H04L 69/324 |
| 10,341,036 B2 * | 7/2019 | Oh | ........................ H04H 20/65 |
| 10,499,095 B2 * | 12/2019 | Kwon | ................ H04N 21/2343 |
| 10,666,477 B2 * | 5/2020 | Lee | ......................... H04L 1/007 |
| 10,757,362 B2 * | 8/2020 | Lee | ..................... H04L 27/2602 |
| 2009/0203326 A1 | 8/2009 | Vesma et al. | |
| 2010/0074188 A1 | 3/2010 | Hsu | |
| 2012/0307842 A1 | 12/2012 | Petrov et al. | |
| 2012/0314762 A1 | 12/2012 | Herrmann et al. | |
| 2013/0291027 A1 | 10/2013 | Hwang et al. | |
| 2015/0043672 A1 | 2/2015 | Kim et al. | |
| 2015/0146804 A1 | 5/2015 | Baek et al. | |
| 2015/0304070 A1 | 10/2015 | Baek et al. | |
| 2016/0037192 A1 | 2/2016 | Petrov et al. | |
| 2016/0056922 A1 | 2/2016 | Baek et al. | |
| 2016/0056923 A1 | 2/2016 | Baek et al. | |
| 2017/0164017 A1 | 6/2017 | Hwang et al. | |
| 2017/0207867 A1 | 7/2017 | Kwon et al. | |

FOREIGN PATENT DOCUMENTS

| | | |
|---|---|---|
| CN | 102301700 A | 12/2011 |
| EP | 2 211 514 A1 | 7/2010 |
| EP | 2 268 004 A2 | 12/2010 |
| GB | 2470756 A | 12/2010 |
| JP | 2012-503955 A | 2/2012 |
| JP | 2015-92692 A | 5/2015 |
| KR | 10-1409548 B1 | 6/2014 |
| KR | 10-2016-0018844 A | 2/2016 |
| KR | 10-2017-0031699 A | 3/2017 |
| WO | 2010/090373 A1 | 8/2010 |
| WO | 2016/010404 A1 | 1/2016 |

OTHER PUBLICATIONS

Zhang Youfang, "The Study and Implementation of Key Technologies for Next Generation of wireless Broadcasting Network," School of Information Engineering, Nanchang Hangkong University, Nanchang, China, Jun. 2013, total 61 pages.

"ATSC Candidate Standard: Signaling, Delivery, Synchronization, and Error Protection (A/331)" Mar. 1, 2016, Advanced Television Systems Commitee, Doc S33-1-500r3, 135 pages total.

"ATSC Candidate Standard: Physical Layer Protocol", Feb. 24, 2016, Advanced Television Systems Committee, Doc. S32-230r35, 254 pages total.

Search Report dated May 23, 2017, issued by the International Searching Authority in International Application No. PCT/KR2017/002330 (PCT/ISA/210).

Written Opinion dated May 23, 2017, issued by the International Searching Authority in International Application No. PCT/KR2017/002330 (PCT/ISA/237).

Communication dated Jan. 29, 2020, issued by the Korean Intellectual Property Office in counterpart Korean Application No. 10-2018-7016792.

Communication dated Jun. 18, 2019 issued by the Canada Intellectual Property Office in counterpart Canadian Application No. 3,014,528.

Communication dated May 25, 2020 issued by the Intellectual Property Office of P.R. China in Application No. 201780013210.6.

Communication dated Jul. 21, 2020 issued by the Korean Patent Office in Application No. 10-2018-7016792.

* cited by examiner

RECEIVER AND PLP PROCESSING METHOD THEREFOR

TECHNICAL FIELD

Apparatuses and methods consistent with the present disclosure relate to a receiving apparatus and a PLP processing method therefor, and more particularly, to a receiving apparatus that processes PLP data processed by a transmitting apparatus through PLP and a PLP processing method therefor.

BACKGROUND ART

Recently, broadcasting communication services are becoming multifunctional and broadband high quality. In particular, with the development of electronic technology, the spread of mobile broadcasting devices such as high-definition digital TVs and high-specification smart phones is increasing, and accordingly, there is a growing demand for various receiving methods and various services for broadcasting services.

In accordance with this demand, a broadcasting communication standard such as ATSC (Advanced Television System Committee) 3.0 has been developed as an example. Therefore, it is required to search for a method to transmit/receive signals more efficiently in accordance with the method proposed in the ATSC 3.0.

DISCLOSURE

Technical Problem

The present disclosure provides a receiving apparatus capable of obtaining LLS transmitted through different PLPs and a PLP processing method therefor.

Technical Solution

According to an aspect of the present disclosure, a receiving apparatus for receiving a plurality of broadcast services includes a receiving apparatus configured to receive, through a channel, a frame included in PLPs (Physical Layer Pipes) including different LLS (Low Level Signaling) for the respective broadcast services; and a signal processor configured to calculate a size of a memory required for time de-interleaving the PLPs including the LLS and process the PLPs including the LLS based on the calculated size of the memory.

The signal processor may be configured to calculate a size of a memory required for time de-interleaving a first PLP including LLS for a first broadcast service and a second PLP including LLS for a second broadcast service, compare the calculated size of the memory with a size of a memory provided in the receiving apparatus for time de-interleaving, and process the first PLP and the second PLP based on a comparison result.

The signal processor may be configured to process the first PLP and the second PLP simultaneously when the calculated size of the memory is smaller than the size of the memory provided in the receiving apparatus.

The signal processor may be configured to process the first PLP and the second PLP separately when the calculated size of the memory is greater than the size of the memory provided in the receiving apparatus.

The signal processor may be configured to calculate the number of cells required for time de-interleaving the PLPs including the LLS during a channel scan.

The signal processor may be configured to simultaneously process all the PLPs including the LLS when the calculated number of cells is equal to or less than a predetermined number.

When the calculated number of cells is greater than the predetermined number, the signal processor may be configured to process the number of PLPs that may is capable of being time de-interleaved simultaneously among the PLPs including the LLS using the predetermined number of cells and process the remaining PLPs after processing the PLPs.

The predetermined number may be the number of cells in the memory provided in the receiving apparatus for time de-interleaving.

The signal processor may be configured to calculate the number of cells required for time interleaving at least one PLP including LLS for the remaining services in a state where the at least one PLP including one service among the plurality of services received through the channel is processed.

The signal processor may be configured to simultaneously process the at least one PLP including LLS for the remaining services when a value of a sum of the calculated number of cells and the number of cells used for time de-interleaving the at least one PLP including one service is equal to or less than a predetermined number and when the number of the at least one PLP including LLS for the remaining services satisfies a predetermined condition.

The signal processor may be configured to separately process the at least one PLP including LLS for the remaining services when a value of a sum of the calculated number of cells and the number of cells used for time de-interleaving the at least one PLP including one service is greater than the predetermined number and when the number of the at least one PLP including LLS for the remaining services does not satisfy the predetermined condition.

The predetermined number may be the number of cells of the memory provided in the receiving apparatus for the time de-interleaving, and the predetermined condition may be a condition that the number of the at least one PLP including LLS for the remaining services is equal to or less than a value obtained by subtracting the number of the at least one PLP including one service from the number of PLPs that is capable of being simultaneously processed by the receiving apparatus.

According to another aspect of the present disclosure, a method of processing a PLP (Physical Layer Pipe) of a receiving apparatus for receiving a plurality of broadcast services includes receiving, through a channel, a frame included in PLPs including different LLS (Low Level Signaling) for the respective broadcast services; and calculating a size of a memory required for time de-interleaving the PLPs including the LLS and processing the PLPs including the LLS based on the calculated size of the memory.

The processing may include calculating a size of a memory required for time de-interleaving a first PLP including LLS for a first broadcast service and a second PLP including LLS for a second broadcast service, comparing the calculated size of the memory with a size of a memory provided in the receiving apparatus for time de-interleaving, and processing the first PLP and the second PLP based on a comparison result.

The processing may include processing the first PLP and the second PLP simultaneously when the calculated size of the memory is smaller than the size of the memory provided in the receiving apparatus, and processing the first PLP and the second PLP separately when the calculated size of the memory is greater than the size of the memory provided in the receiving apparatus.

Advantageous Effects

According to the diverse exemplary embodiments of the present disclosure, it is possible to process LLS transmitted through another PLP, thereby effectively obtaining an SLT.

BEST MODE

Although general terms used in the present disclosure are selected to describe exemplary embodiments in consideration of the functions thereof, these general terms may vary according to intentions of one of ordinary skill in the art, legal or technical interpretation, the advent of new technologies, and the like. Some terms are arbitrarily selected by the applicant of the exemplary embodiments. In this case, the meaning will be described in detail in the description of the present disclosure. Accordingly, the terms used in the present disclosure should be defined based on the meaning of the term, not on the name of a simple term, but on the entire contents of the disclosure.

When an element is referred to as "including" an element throughout the specification, it is to be understood that the element may include other elements as well, without departing from the other elements unless specifically stated to the contrary. Also, the terms " . . . part", "module", and the like described in the specification mean units for processing at least one function or operation, which may be implemented by hardware or software or by a combination of hardware and software.

Hereinafter, exemplary embodiments of the present disclosure will be described in more detail with reference to the accompanying drawings. In describing the present disclosure, when it is decided that a detailed description for the known functions or configurations related to the present disclosure may unnecessarily obscure the gist of the present disclosure, the detailed description therefor will be omitted. Also, the following embodiments may be modified into various other forms, and the scope of the technical idea of the present disclosure is not limited to the following embodiments. Rather, these embodiments are provided so that the present disclosure will be more thorough and complete, and will fully convey the scope of the present disclosure to those skilled in the art.

Hereinafter, various embodiments of the present disclosure will be described in detail with reference to the accompanying drawings.

Figure 1:
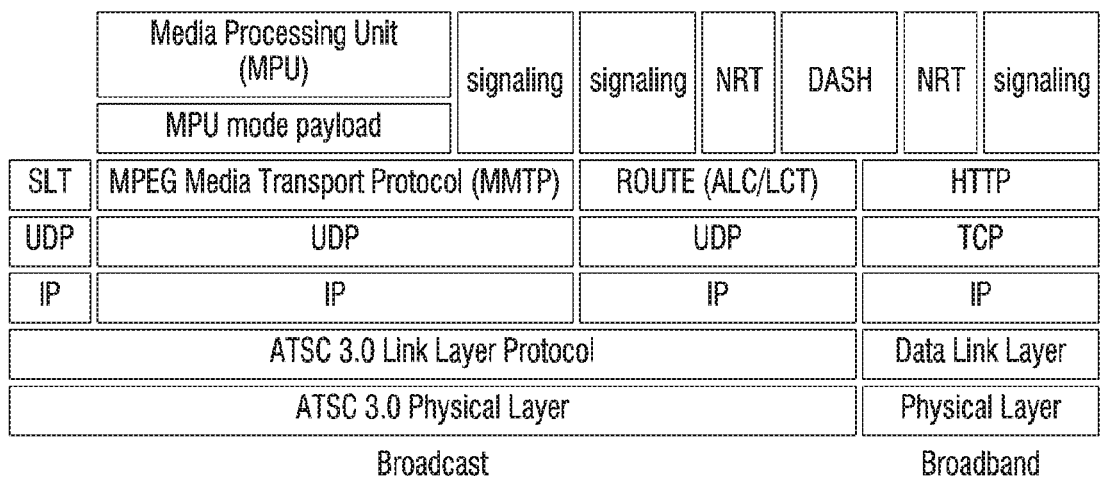
FIG. 1 is a diagram for explaining a protocol stack defined in the ATSC 3.0 standard.

FIG. 1 is a diagram for explaining a protocol stack according to an exemplary embodiment of the present disclosure.

FIG. 1 shows the protocol stack defined in the Advanced Television System Committee (ATSC) 3.0 standard. A transmitting apparatus according to an exemplary embodiment of the present disclosure may process a broadcast service according to the protocol stack as shown in FIG. 1 and transmit the broadcast service to a receiving apparatus.

Hereinafter, with reference to FIG. 1, the protocol stack defined in the ATSC 3.0 standard will be schematically described.

First, in the case of a broadcast protocol stack, there are two methods for transmission of a service.

A first method is to transmit MPUs (Media Processors) using an MMTP (MMT Protocol) based on an MMT (MPEG Media Transport). A second method is to transmit DASH segments using a Real Time Object Delivery over Unidirectional Transport (ROUTE) based on MPEG DASH (Dynamic Adaptive Streaming over HTTP).

At this time, signaling may be delivered via MMTP and/or ROUTE, and bootstrap signaling may be provided via an SLT (Service List Table).

Specifically, the MMTP may transmit signaling and service data (e.g., audio data and video data for providing the broadcast service) formatted in the MPU format defined in the MMT. At this time, they may be encapsulated through a User Datagram Protocol (UDP) layer and an IP (Internet Protocol) layer.

ROUTE may then transmit service data formatted in the DASH segment format and non-timed data such as signaling and non-real time (NRT), etc. At this time, they may also be encapsulated through the UDP and IP layers.

Meanwhile, the portion transmitted through SLT, MMTP, and ROUTE may be processed at the UDP, IP layer, and then re-encapsulated in a link layer (ATSC 3.0 Link Layer Protocol). The data processed in the link layer may be multicasted as a broadcast signal through processes such as encoding, interleaving, modulation, etc. in a physical layer (ATSC 3.0 Physical Layer).

Meanwhile, in the case of a broadband protocol stack, it may be transmitted through Hypertext Transfer Protocol (HTTP). Specifically, the service data formatted in the form of the DASH segment, signaling and NRT may be transmitted via HTTP. At this time, they may be processed through TCP (Transmission Control Protocol) and IP layer, then encapsulated through the link layer, and then processed for transmission in the physical layer and unicasted to broadband.

Meanwhile, signaling may include bootstrap signaling via SLT and Service Layer Signaling (SLS). These may include information needed to obtain the service in the receiving apparatus.

Here, SLS means signaling providing information about the discovery and acquisition of a service component (e.g., audio data and video data for the broadcast service, etc.).

SLT allows the receiving apparatus to generate a list of services and bootstrap the acquisition of SLS for each service. Specifically, SLT supports a channel scan such that the receiving apparatus may generate the list of services that may be received through a channel name, a channel number, and the like, and provides information required for the receiving apparatus to locate the SLS for each service.

Meanwhile, the SLS is signaling information located in an upper layer of ROUTE in the protocol stack, and may be transmitted through ROUTE, UDP, and IP, and the receiving apparatus may access a desired service component through the SLS.

Also, the SLT may include access information for accessing an MMT signaling component delivered by the MMTP. That is, the SLT may bootstrap the SLS according to the MMTP. At this time, the SLS may be delivered by a MMTP signaling message defined by the MMT, and the receiving apparatus may access the service component (MPU) through the SLS. Meanwhile, an NRT service component is transmitted through a ROUTE protocol, and the SLS according to the MMTP may also include information for accessing the NRT service component.

Meanwhile, LLS (Low Level Signaling) may include signaling information for bootstrapping the service acquisition by the receiving apparatus and supporting the fast channel scan, and may be located in a portion represented by "SLT" in the protocol stack.

In this case, UDP/IP packets carrying the LLS may be formatted in an LLS table. In this case, the LLS table may include an LLS table ID field that identifies the type of the LLS table and an LLS table version field that identifies the version of the LLS table. In this case, depending on a value indicated by the LLS table ID field, the LLS table may include SLT or may include a Rating Region Table (RRT). Here, the RRT may include information about content advisory rating.

Meanwhile, according to the ATSC 3.0 standard, the transmitting apparatus may transmit an Electronic Service Guide (ESG) for a program guide and an Emergency Alert System (EAS) for providing disaster information, etc., to the receiving apparatus on a broadcast signal.

Meanwhile, in FIG. 1, in the case of the link layer, an ALP (ATSC 3.0 Link layer Protocol) packet is generated by inputting an IP packet and is transmitted to the physical layer. However, the link layer does not use only IP packets including service data, signaling, ESG, and EAS as input, and may use MPEG2-TS packets or generalized packetized data as input. At this time, signaling information required for controlling the link layer is also transferred to the physical layer in the form of the ALP packet.

In FIG. 1, the physical layer receives the ALP packet, processes the ALP packet to generate a physical layer frame, converts the physical layer frame into a radio signal, and transmits the radio signal. At this time, the physical layer may include at least one PLP (Physical Layer Pipe). Herein, the PLP means a logical channel in the physical layer that delivers the service data or related metadata capable of delivering one or more services or service components. In this case, for each PLP, specific coding parameters and modulation may be applied.

Meanwhile, in the physical layer, input data is processed using the following method.

Specifically, an input formatting module may generate baseband packets for each PLP by input formatting each input data, and a BICM module (Bit Interleaved Coding and Modulation module) may generate cells (or data cells) for each PLP through FEC (Forward Error Correction), interleaving, and modulation.

A framing & interleaving module may then time-interleave cells of each PLP and map the time-interleaved cells to a frame in a frequency domain. In some cases, the framing & interleaving module (not shown) may frequency interleave the cells mapped to the orthogonal frequency division multiplexing (OFDM) symbol of the frame.

A waveform generation modulus (not shown) may insert a pilot into a frame, transform the OFDM symbols of the frame into a time domain through IFFT (Inverse Fast Fourier Transform), perform a PAPR (Peak to Average Power Ratio) reduction using reserve tone, insert a guard interval into the frame, and transmit a broadcast signal to a receiving apparatus (not shown).

Figure 2:
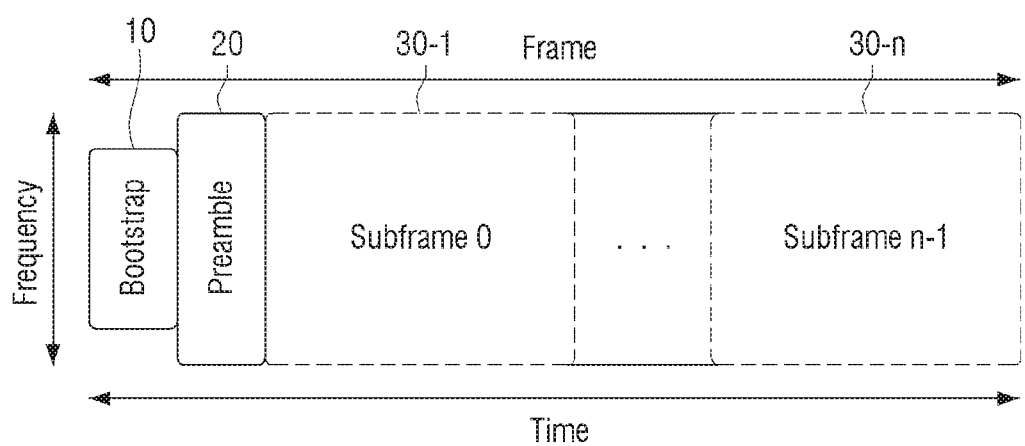
FIG. 2 is a diagram for explaining a frame structure defined in the ATSC 3.0 standard.

Meanwhile, according to the ATSC 3.0 standard, as shown in FIG. 2, a frame includes a bootstrap 10, a preamble 20, and at least one subframes 30-1, . . . , 30-n).

Specifically, the bootstrap 10 is located at the beginning of the frame, the preamble 20, which includes L1 signaling (i.e., L1 basic signaling and L1 detail signaling) is located after the bootstrap 10, and the at least one subframes 30-1, . . . , 30-n are located after the preamble 20. They consist of at least one OFDM symbols, and the number of carriers of each OFDM symbol may be determined according to an FFT mode (i.e., the FFT size).

Meanwhile, the subframe may include subframe boundary symbols located at boundaries between other subframes, and data symbols located between the subframe boundary symbols. However, this is only an example, and the subframe may be composed of data symbols only. Also, only a first symbol or a last symbol in the subframe corresponds to the subframe boundary symbol, and the remaining symbols may be configured as data symbols.

The above process schematically explains the method of processing the broadcast service in the ATSC 3.0 standard. The transmitting apparatus according to an exemplary embodiment of the present disclosure may process the broadcast service according to the method defined in the ATSC 3.0 standard and transmit the broadcast service to the receiving apparatus.

Meanwhile, in the ATSC 3.0 standard, regarding the time interleaving of the physical layer, there are three modes of time interleaving.

That is, there are a mode (i.e. no time interleaving mode) for performing no time interleaving, a mode (i.e., a CTI mode) for performing convolutional time interleaving using a convolutional time interleaver (CTI) and a mode (i.e., a HTI mode) for performing hybrid time interleaving using a Hybrid Time Interleaver (HTI).

At this time, when time interleaving is performed on one service, the maximum size of memory of the time interleaver is limited to $2^{19}$ (i.e., 2^19) cells. Therefore, when the receiving apparatus also time de-interleaves the PLP simultaneously, the maximum size of the memory used for time de-interleaving must satisfy $2^{19}$ cells.

Also, according to the ATSC 3.0 standard, the receiving apparatus is described as capable of decoding at least four PLPs to receive one service.

However, the transmitting apparatus may apply different protection levels to video, first audio, second audio, and signaling required to provide one service, and may transmit them to the receiving apparatus. That is, the transmitting apparatus may process the video, the first audio, the second audio, and the signaling through different PLPs, thereby varying degrees of robustness for each data. At this time, generally, the transmitting apparatus may use one to four PLPs to provide one service.

Accordingly, it is assumed in the present disclosure that the receiving apparatus is configured to process a maximum of four PLPs simultaneously.

Thus, under the restrictions on the number of PLPs that may be processed simultaneously and the size of the memory of the time de-interleaver, the receiving apparatus may not be able to process another service while processing one service.

Specifically, the receiving apparatus time-de-interleaves data included in up to four PLPs using up to $2^{19}$ cells during processing the service. At this time, due to the restriction on the memory size of the time de-interleaver, when no additional memory is used, the receiving apparatus may not process another service while processing one service due to insufficient memory size. In this case, since the receiving apparatus may not receive an SLT included in LLS with respect to the other service, the receiving apparatus may not monitor channel information provided by the service, or since the receiving apparatus may not receive ESG and EAS provided by other services, the receiving apparatus may not obtain additional information provided by the relevant service.

Hereinafter, a more detailed description will be given with reference to FIGS. 3 to 8 attached hereto.

FIGS. 3 to 8 are diagrams illustrating various examples of a method performed by a transmitting apparatus of processing a broadcast service according to various exemplary embodiments of the present disclosure.

Figure 3:
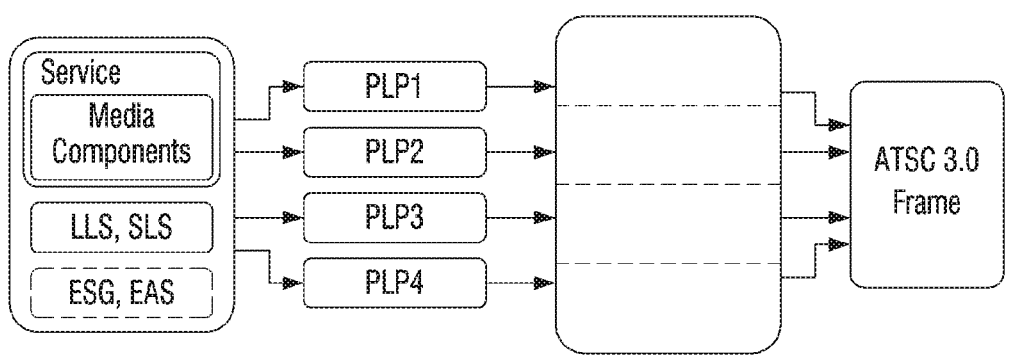
FIGS. 3 to 8 are diagrams for explaining a method performed by a transmitting apparatus of providing a service according to an exemplary embodiment of the present disclosure.

For example, as shown in FIG. 3, the transmitting apparatus may process data for providing a service through four PLPs (PLP1 to PLP4), and transmit a frame (i.e., an ATSC 3.0 frame) including the four PLPs to a receiving apparatus through an RF channel.

Here, the data may include media components (e.g., audio and video data for the broadcast service), LLS and SLS for the service.

At this time, when the transmitting apparatus time-interleaves the four PLPs together, the four PLPs may be configured such that memory used for time interleaving is a maximum of $2^{19}$ cells.

As described above, when four PLPs are configured for one service and the memory size required for time de-interleaving is a maximum of $2^{19}$ cells, the receiving apparatus may process the four PLPs included in the received frame and transmit the data transmitted by the transmitting apparatus.

In particular, the receiving apparatus may process a PLP including the LLS for the service among the four PLPs, receive the LLS for the service, and obtain an SLT for the service through the LLS. At this time, when the transmitting apparatus processes LLS and SLS through the same PLP, the receiving apparatus may receive both LLS and SLS by processing the corresponding PLP.

Meanwhile, in some cases, the transmitting apparatus may further provide ESG and EAS. In this case, the transmitting apparatus also processes the media component, the ESG, the EAS, and the LLS and SLS for the service through the four PLPs. When the transmitting apparatus time-interleaves the PLPs together, the four PLPs are configured to have a maximum memory size of $2^{19}$ cells.

Figure 4:
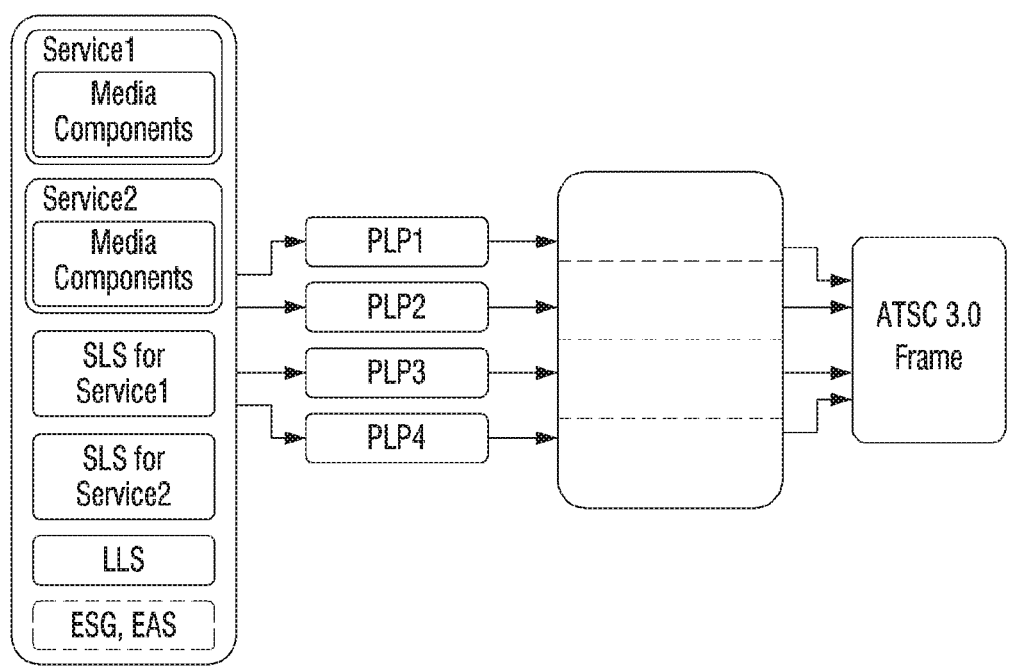

As another example, as shown in FIG. 4, the transmitting apparatus may process data for providing the service through the four PLPs (PLP1 to PLP4), and transmit a frame including the four PLPs to the receiving apparatus via the RF channel.

Here, the data may include N (where N is an integer of 2 or more and N=2 in FIG. 4) broadcast content. Specifically, the data may include media components (i.e., first broadcast content) for a first service, SLS for the first service, media components (i.e., second broadcast content) for a second service, SLS for a second service, and LLS. At this time, the LSS may include LLS for the first service and LLS for the second service.

At this time, when the transmitting apparatus time-interleaves the four PLPs together, the four PLPs may be configured such that the memory used for time interleaving is a maximum of $2^{19}$ cells.

As described above, when the number of PLPs for one service is four and the memory size required for time de-interleaving is a maximum of $2^{19}$ cells, the receiving apparatus may process the four PLPs included in the received frame, and receive the data transmitted by the transmitting apparatus.

In particular, the receiving apparatus may process a PLP including the LLS for the service among the four PLPs, receive LLS for the service, and obtain an SLT for the service through the LLS. At this time, when the transmitting apparatus processes LLS and SLS through the same PLP, the receiving apparatus may receive both LLS and SLS by processing the corresponding PLP.

Meanwhile, in some cases, the transmitting apparatus may further provide ESG and EAS. In this case, the transmitting apparatus also processes the media component, the ESG, the EAS, and the LLS and SLS for the service through the four PLPs. When the transmitting apparatus time-interleaves the PLPs together, the four PLPs are configured to have a maximum memory size of $2^{19}$ cells.

Figure 5:
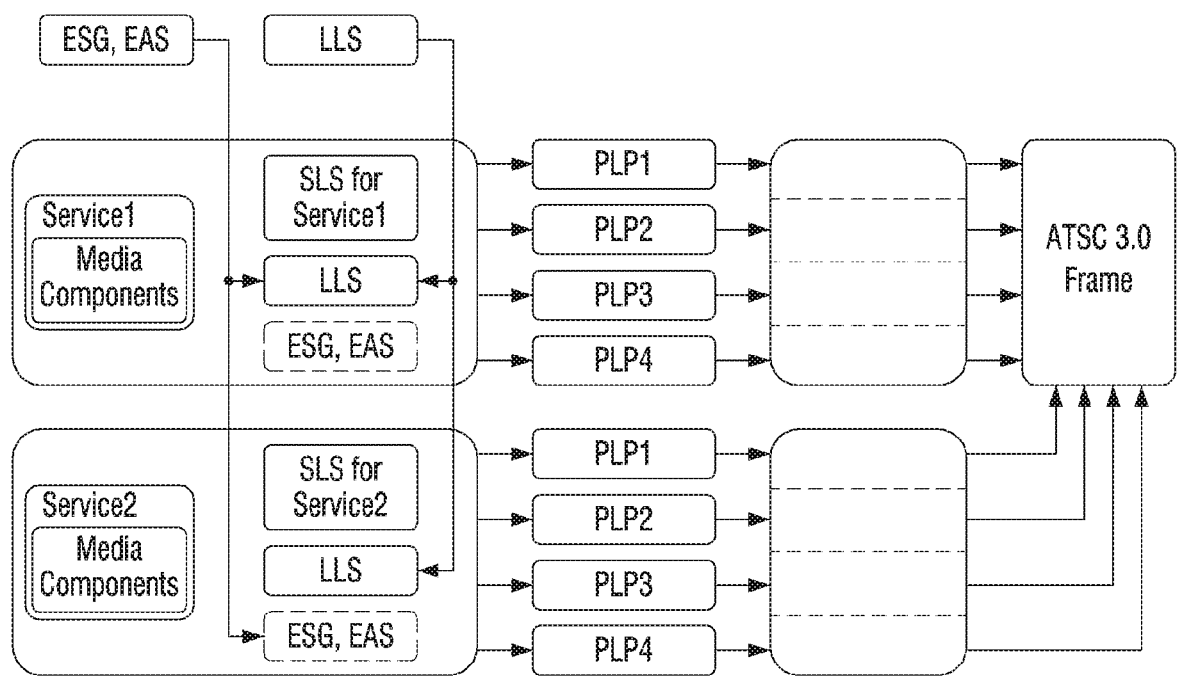

As another example, as shown in FIG. 5, the transmitting apparatus may process data for providing the first service through the four PLPs (PLP1 to PLP4), process data for providing the second service through four PLPs (PLP5 to PLP8) and transmit frames including the eight PLPs to the receiving apparatus over the RF channel.

Here, the data for providing the first service may include a media component and SLS and LLS for the first service. The data for providing the second service may include a media component and SLS and LLS for the second service. At this time, the LLS may include LLS for the first service and LLS for the second service.

At this time, when the transmitting apparatus time-interleaves each four PLPs together, each four PLPs may be configured such that the memory used for time interleaving is a maximum of $2^{19}$ cells.

As described above, when the number of PLPs for each service is four and the memory size required for time de-interleaving is a maximum of $2^{19}$ cells, the receiving apparatus may receive the data for the first service by processing the four PLPs (PLP1 to PLP4) included in the received frame or receive the data for the second service by processing the four PLPs (PLP5 to PLP8) included in the received frame.

In particular, when receiving the data for the first service, the receiving apparatus may process the PLP including the LLS for the first and second services among the four PLPs (PLP1 to PLP4) for the first service, receive the LLS for the first and second services, and obtain the SLT for the first and second services through the LLS. Also, when receiving the data for the second service, the receiving apparatus may process the PLP including the LLS for the first and second services among the four PLPs (PLP5 to PLP8) for the second service, receive the LLS for the first and second services, and obtain the SLT for the first and second services through the LLS.

Meanwhile, in some cases, the transmitting apparatus may further provide ESG and EAS. In this case, for each service, the transmitting apparatus also processes the media component, ESG, EAS, and the LLS and SLS for the service through the four PLPs. When the transmitting apparatus time-interleaves the PLPs together, the four PLPs are configured to have a maximum memory size of $2^{19}$ cells. At this time, ESG and EAS may include the same information for each service or may include different information for each service.

Meanwhile, in FIG. 5, it is described that LLS for all services is provided through all services. However, this is only an example, and as shown in FIG. 6, LLS for all services may not be provided through all services, but may be provided through only some services.

Figure 6:
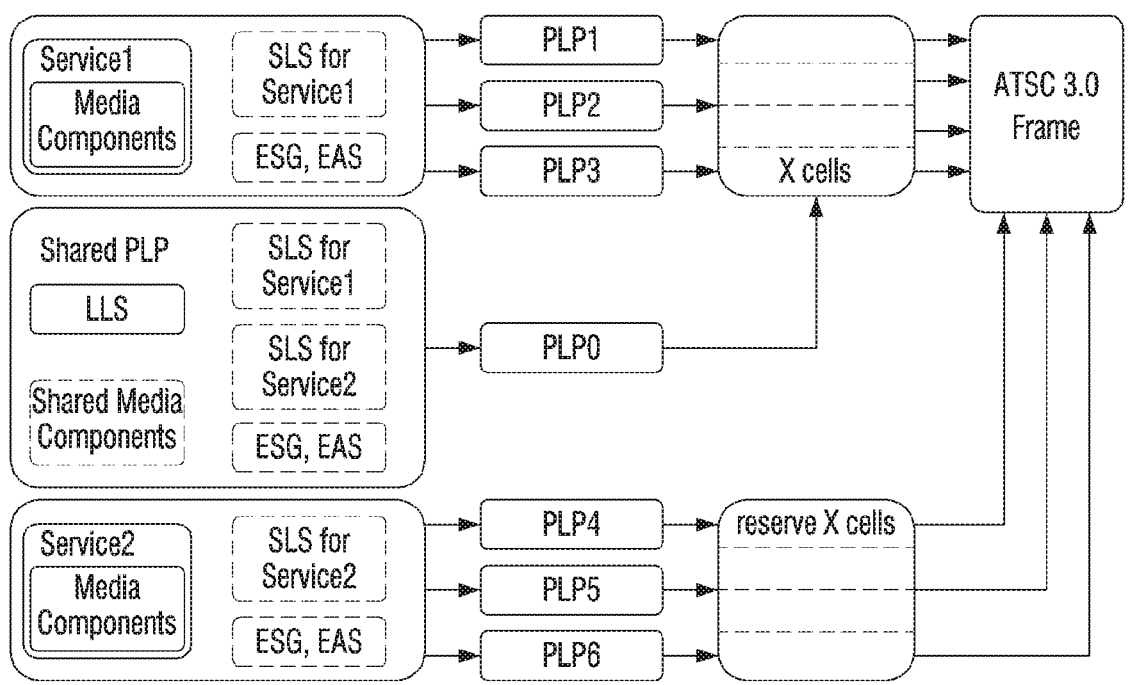

For example, as shown in FIG. 6, the LLS for the first and second services may be provided only through the first service and not through the second service.

Specifically, the transmitting apparatus may process the media component for the first service, the SLS for the first service, and the LLS for the first and second services through the four PLPs (PLP0 to PLP3), process the media component for the second service, the SLS for the second service through the three PLPs (PLP4 to PLP6), and transmit a frame including the seven PLPs to the receiving apparatus through the RF channel.

Here, the PLP (PLP0) through which the LLS for the first and second services is transmitted may be referred to as a shared PLP.

At this time, when the transmitting apparatus time-interleaves the four PLPs (PLP0 to PLP3) together, the four PLPs (PLP0 to PLP3) may be configured such that the memory used for time interleaving is a maximum of $2^{19}$ cells. Also, when the transmitting apparatus time-interleaves the three PLPs (PLP4 to PLP6) together, the three PLPs (PLP4 to PLP6) may be configured such that the memory used for time interleaving is a maximum of $2^{19}$ cells.

Here, when X cells are used upon interleaving for the shared PLP, the X cells may be reserved in the memory upon interleaving for the second service.

As described above, when the number of PLPs for each service is 4 or 3, and the memory size required for time de-interleaving is a maximum of $2^{19}$ cells, the receiving apparatus may receive the data for the first service by processing the four PLPs (PLP0 to PLP3) included in the received frame or receive the data for the second service by processing the three PLPs (PLP5 to PLP8) included in the received frame.

In particular, when receiving the data for the first service, the receiving apparatus may process the PLP (PLP0) including the LLS for the first and second services among the four PLPs (PLP0 to PLP3) for the first service, receive the LLS for the first and second services, and obtain the SLT for the first and second services through the LLS.

Meanwhile, in some cases, the transmitting apparatus may further provide ESG and EAS. In this case, for each service, the transmitting apparatus also processes the media component, ESG, EAS, and the LLS and SLS for the service through four or three PLPs. When the transmitting apparatus time interleaves the four or three PLPs together, the four or three PLPs are configured to have a maximum memory size of $2^{19}$ cells. At this time, ESG and EAS may include the same information for each service or may include different information for each service.

The transmitting apparatus may also transmit shared media components available in the first and second services to the receiving apparatus via the shared PLP. Also, the transmitting apparatus may transmit the SLS for the first service and the SLS for the second service to the receiving apparatus via the shared PLP, and may transmit the ESG and EAS to the receiving apparatus via the shared PLP.

Meanwhile, in FIG. 3 to FIG. 6, examples in which the transmitting apparatus processes and transmits services provided by one provider (e.g., a broadcaster) are described. Hereinafter, examples in which the transmitting apparatus processes and transmits services provided by different providers will be described.

Figure 7:
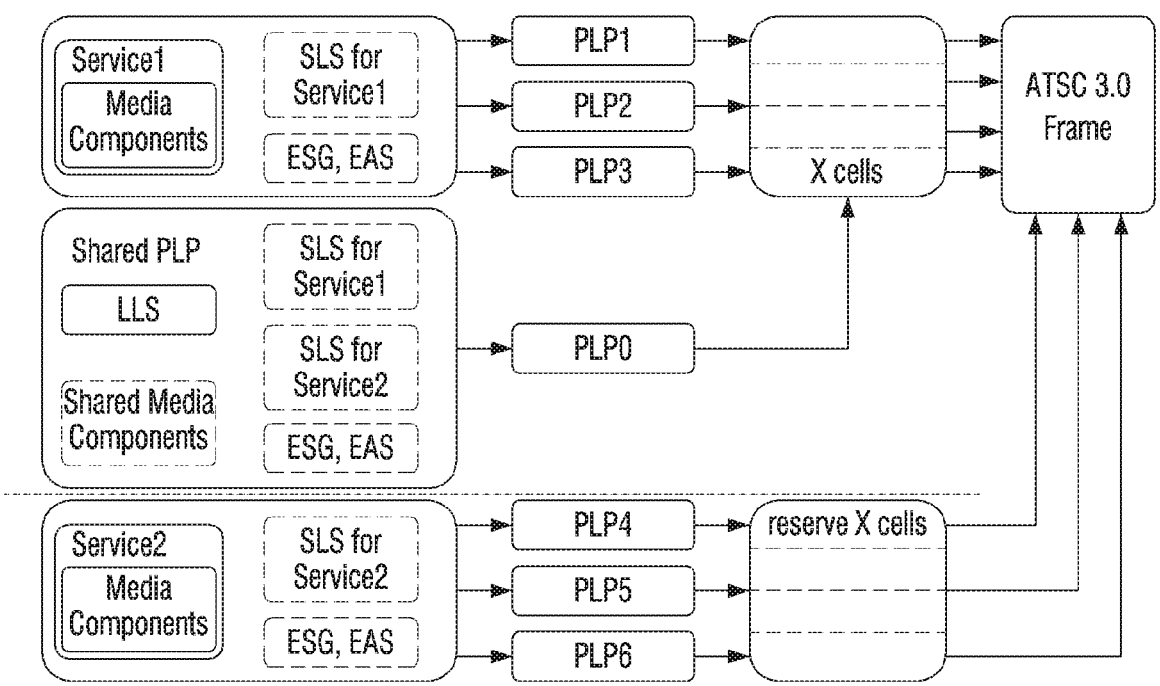

For example, as shown in FIG. 7, the transmitting apparatus may process the media component for the first service, the SLS for the first service, and the LLS for the first and second services through the four PLPs (PLP0 to PLP3), process the media component for the second service and the SLS for the second service through the three PLPs (PLP4 to PLP6), and transmit a frame including the seven PLPs to the receiving apparatus through the RF channel.

Here, the first service may be a service provided by a first provider, and the second service may be a service provided by a second provider.

Also, the PLP (PLP0) through which the LLS for the first and second services is transmitted corresponds to the shared PLP.

At this time, when the transmitting apparatus time-interleaves the four PLPs (PLP0 to PLP3) together, the four PLPs (PLP0 to PLP3) may be configured such that the memory used for time interleaving is a maximum of $2^{19}$ cells. Also, when the transmitting apparatus time-interleaves the three PLPs (PLP4 to PLP6) together, the three PLPs (PLP4 to PLP6) may be configured such that the memory used for time interleaving is a maximum of $2^{19}$ cells.

Here, when X cells are used upon interleaving for the shared PLP, the X cells may be reserved in the memory upon interleaving for the second service.

As described above, when the number of PLPs for each service is 4 or 3, and the memory size required for time de-interleaving is a maximum of $2^{19}$ cells, the receiving apparatus may receive the data for the first service by processing the four PLPs (PLP0 to PLP3) included in the received frame or receive the data for the second service by processing the three PLPs (PLP5 to PLP8) included in the received frame.

In particular, when receiving the data for the first service, the receiving apparatus may process the PLP (PLP0) including the LLS for the first and second services among the four PLPs (PLP0 to PLP3) for the first service, receive the LLS for the first and second services, and obtain the SLT for the first and second services through the LLS.

Meanwhile, in some cases, the transmitting apparatus may further provide ESG and EAS. In this case, for each service, the transmitting apparatus also processes the media component, ESG, EAS, and the LLS and SLS for the service through four or three PLPs. When the transmitting apparatus time interleaves the four or three PLPs together, the four or three PLPs are configured to have a maximum memory size of $2^{19}$ cells. At this time, ESG and EAS may include the same information for each service or may include different information for each service.

The transmitting apparatus may also transmit shared media components available in the first and second services to the receiving apparatus via the shared PLP. Also, the transmitting apparatus may transmit the SLS for the first service and the SLS for the second service to the receiving apparatus via the shared PLP, and may transmit the ESG and EAS to the receiving apparatus via the shared PLP.

In the above-described examples, the receiving apparatus may obtain the LLS of all services provided over the RF channel and obtain the SLT using the LLS.

However, there is a case where LLS for a specific service may not be obtained among the services provided through the RF channel due to the memory size restriction for time de-interleaving, and thus the SLT for the service is not obtained. Hereinafter, an example will be described in more detail with reference to FIG. 8 attached hereto.

Figure 8:
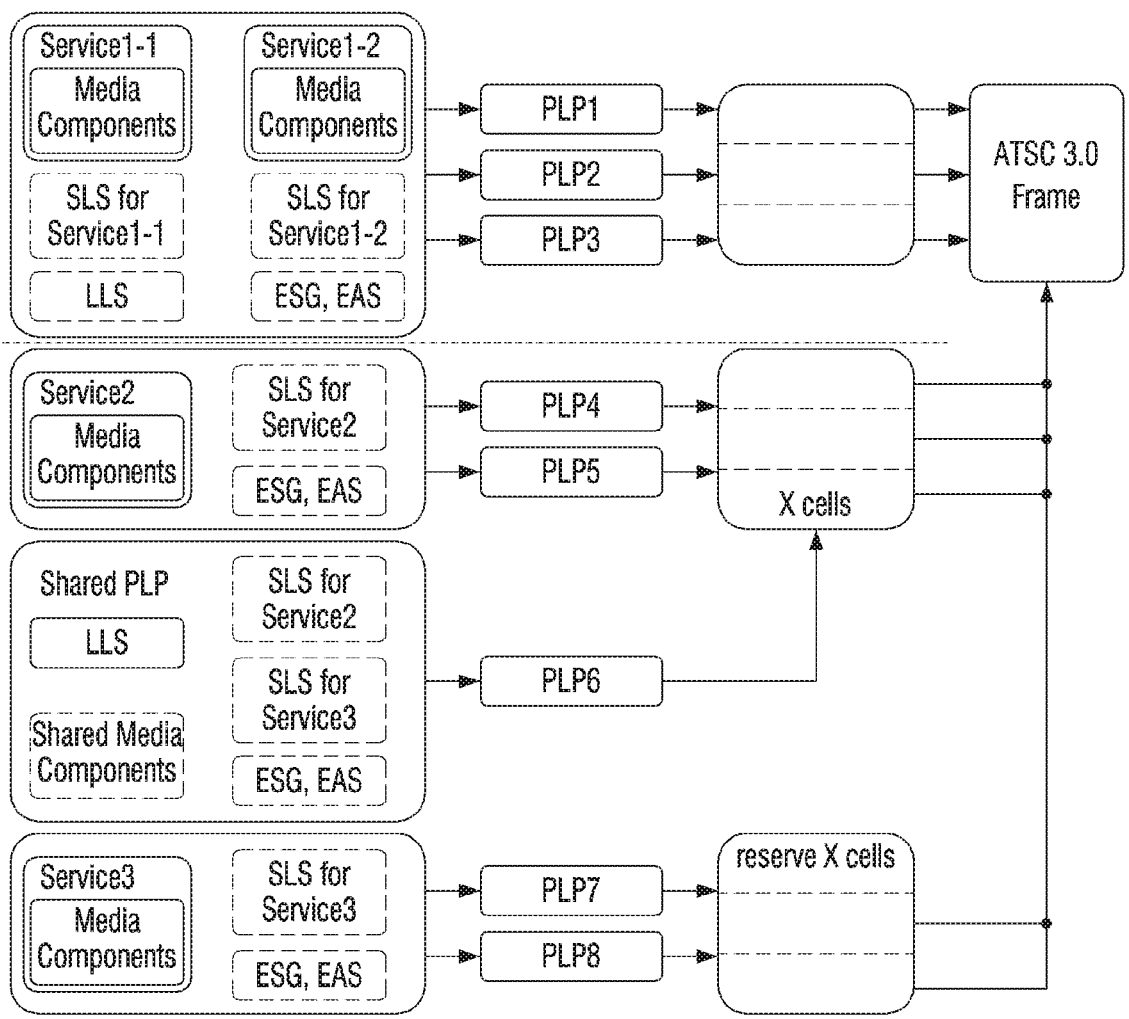

For example, as shown in FIG. 8, the transmitting apparatus may process data through eight PLPs and transmit a frame including the eight PLPs to the receiving apparatus through the RF channel.

Here, the first service may be a service provided by the first provider, and the second and third services may be a service provided by the second provider.

At this time, the transmitting apparatus may process the data for providing the first service through the three PLPs (PLP1 to PLP3).

Here, the data may include N (where N is an integer of 2 or more, and N=2 in FIG. 8) broadcast content. Specifically, the data may include a media component (i.e., first broadcast content) for a 1-1th service, an SLS for the 1-1th service, a media component (i.e., second broadcast content) for a 1-2th service, an SLS for the 1-2th service, and LLS. At this time, the LLS may include LLS for the 1-1th service and the LLS for the 1-2th service.

At this time, when the transmitting apparatus time-interleaves the three PLPs (PLP1 to PLP3) together, the three PLPs (PLP1 to PLP3) may be configured such that the memory size used for time interleaving is a maximum of $2^{19}$ cells.

Then, the transmitting apparatus may process the media component for the second service, the SLS for the second service, and the LLS for the second and third services through the three PLPs (PLP4 to PLP6). Here, the PLP (PLP6) through which the LLS for the second and third services is transmitted corresponds to the shared PLP.

At this time, when the transmitting apparatus time-interleaves the three PLPs (PLP4 to PLP6) together, the three PLPs (PLP4 to PLP6) may be configured such that the memory used for time interleaving is a maximum of $2^{19}$ cells.

Also, the transmitting apparatus may process a media component for a third service and a SLS for the third service through two PLPs (PLP7 and PLP8).

At this time, when the transmitting apparatus time-interleaves the two PLPs (PLP7 and PLP8) together, the two PLPs (PLP7 and PLP8) may be configured such that the memory size used for time interleaving is a maximum of $2^{19}$ cells. Here, when X cells are used upon interleaving for the shared PLP, the X cells may be reserved in the memory upon interleaving for a fourth service.

As described above, when the number of PLPs for each service is 4, 3, or 2, and the memory size required for time de-interleaving is a maximum of $2^{19}$ cells, the receiving apparatus may receive the data for the first service by processing the three PLPs (PLP1-PLP3) included in the received frame, receive the data for the second service by processing the three PLPs (PLP4 to PLP6) included in the received frame, or receive the data for the third service by processing the two PLP (PLP7, PLP8) included in the received frame.

In particular, when receiving the data for the first service, the receiving apparatus may receive the LLS for the 1-1th and 1-2th services by processing the PLP (PLP1) including the LLS for the 1-1th and 1-2th services among the three PLPs (PLP1 to PLP3) for the first service, and obtain the SLT for the 1-1th and 1-2th services through the LLS.

Alternatively, when receiving the data for the second service, the receiving apparatus may receive the LLS for the second and third services by processing the PLP (PLP6) including the LLS for the second and third services among the three PLPs (PLP4 to PLP6) for the second service, and obtain the SLT for the second and third services through the LLS.

As described above, because of the memory size of the time de-interleaver, since the receiving apparatus may not process a service provided by another provider while processing a service provided by one provider, the receiving apparatus does not receive the LLS for the service provided by the other provider and eventually may not monitor LLS provided by the other service.

Figure 9:
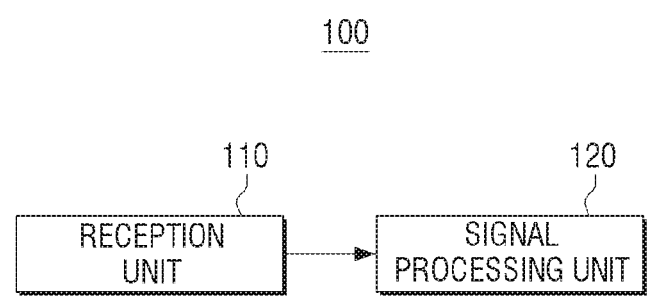
FIG. 9 is a block diagram for explaining a configuration of a receiving apparatus according to an exemplary embodiment of the present disclosure.

Accordingly, in order to solve such a problem, the receiving apparatus according to an exemplary embodiment of the present disclosure appropriately uses memory of a limited size so as to monitor the LLS of the other service, which will be described in more detail below. [125] FIG. 9 is a block diagram illustrating a configuration of a receiving apparatus according to an exemplary embodiment of the present disclosure.

Referring to FIG. 9, the receiving apparatus 100 may include a receiver 110 and a signal processor 120.

The receiver 110 may receive a broadcasting signal from a transmitting apparatus (not shown). To this end, the receiver 110 may include at least one receiving antenna (not shown) or the like.

In this case, the transmitting apparatus (not shown) may process a service according to the ATSC 3.0 standard and transmit the service to the receiving apparatus 100. The broadcast signal may include a plurality of frames according to the ATSC 3.0 standard. At this time, the receiver 110 may receive a frame included in PLPs having different LLS for each broadcast service through a channel (i.e., an RF channel).

The signal processor 120 calculates a size of memory required for time de-interleaving the PLPs including the LLS and processes the PLPs including the LLS based on the calculated size of the memory.

Here, the size of the memory required for time de-interleaving the PLPs including the LLS is equal to the size of memory of a time de-interleaver used for the transmitting apparatus (not shown) to time interleave the PLPs including the LLS. Thus, the signal processor 120 for calculating the size of memory required for time de-interleaving the PLPs including the LLS may mean that the transmitting apparatus (not shown) calculates the size of memory used for time de-interleaving the PLPs including the LLS.

Specifically, the signal processor 120 may calculate the number of cells required for time de-interleaving the PLPs including the LLS, compare the calculated number of cells with the number of currently available cells among a plurality of cells of the memory prepared in the receiving apparatus 100 for time de-interleaving, and process the PLPs including the LLS based on a comparison result.

For example, the signal processor 120 may calculate the size of memory required for time de-interleaving a first PLP including the LLS for the first broadcast service and a second PLP including the LLS for the second broadcast service, compare the calculated size of memory with the size of memory provided in the receiving apparatus 100 for time de-interleaving, and process the first PLP and the second PLP based on a comparison result.

In this case, when the calculated size of memory is smaller than the size of memory provided in the receiving apparatus 100, the signal processor 120 may simultaneously process the first PLP and the second PLP. When the calculated size of memory is larger than the size of memory provided in the receiving apparatus 100, the signal processor 120 may separately process the first PLP and the second PLP.

Hereinafter, a method of processing PLPs including LLS according to whether the receiving apparatus 100 performs a channel scan operation or a current service is described in more detail.

First, when performing the channel scan operation, the receiving apparatus 100 may process the PLPs including the LLS using the following method.

Specifically, the signal processor 120 selects a channel and determines whether LLS is present in a frame (i.e., a current frame) received through the corresponding channel.

In this case, the signal processor 120 may determine whether the LLS exists in the frame based on a flag (i.e., L1B_lls_flag) included in L1 basic signaling of the frame.

Here, L1B_lls_flag is a field indicating the presence or absence of the LLS in at least one PLP of the frame (in this regard, the ATSC 3.0 standard defines L1B_lls_flag as follows: L1B_lls_flag: This field shall indicate the presence or absence of Low Level Signaling (LLS) in one or more PLPs in the current frame. L1B_lls_flag=0 shall indicate there is no LLS signaling in the current frame, while L1B_lls_flag=1 shall indicate there is LLS signaling carried in this frame. The PLP(s) which carry LLS shall be indicated by L1D_plp_lls_flag).

For example, when L1B_lls_flag=0, the signal processor 120 may determine that the LLS is not present in the frame, and when L1B_lls_flag=1, determine that the LLS is present in the frame.

Here, the LLS is not present in the frame, the signal processor 120 may sequentially check L1B_lls_flag of frames following the frame to determine the frame in which the LLS is present.

Meanwhile, when the LLS is present in the frame, the signal processor 120 may determine the PLPs including the LLS among a plurality of PLPs included in the frame.

In this case, the signal processor 120 may determine the PLPs including the LLS based on a flag (i.e., L1D_plp_lls_flag) included in L1 detail signaling of the frame.

Here, L1D_plp_lls_flag is a field indicating which PLP includes the LLS (in this regard, in the ATSC 3.0 standard, L1D_plp_lls_flag is defined as follows: L1D_plp_lls_flag: This field shall indicate whether the current PLP contains LLS information. The purpose of this flag is to allow receiving apparatuses to quickly locate the upper layer signaling information).

The signal processor 120 may calculate the number of cells required for time de-interleaving the PLPs including the LLS.

Specifically, the signal processor 120 may calculate the number of cells required for time de-interleaving all the PLPs including the LLS based on information related to a time interleaver included in the L1 detail signaling of the frame. At this time, a method of calculating the number of cells varies depending on a time interleaving mode of the transmitting apparatus (not shown), and a detailed description thereof will be described later.

The signal processor 120 may process all the PLPs including the LLS simultaneously or may divide and process the PLPs including the LLS several times by comparing the calculated number of cells with a predetermined number.

Here, the predetermined number may be the number of cells of the memory provided in the receiving apparatus 100 for time de-interleaving.

For example, the maximum value of the predetermined number may be $2^{19}$. This is because, as described above, the receiving apparatus 100 may include memory including a maximum of $2^{19}$ cells for time de-interleaving.

Specifically, when the calculated number of cells is equal to or less than the predetermined number, the signal processor 120 may simultaneously process all the PLPs including the LLS.

That is, when the number of cells in the memory prepared for time de-interleaving is greater than or equal to the number of cells required for time de-interleaving all the PLPs including the LLS, all the PLPs including the LLS may be time de-interleaved together. Accordingly, when the calculated number of cells is equal to or less than the predetermined number, the signal processor 120 simultaneously processes all the PLPs including the LLS.

Meanwhile, as described above, the receiving apparatus 100 may process up to four PLPs simultaneously, thereby time-de-interleaving up to four PLPs simultaneously upon time de-interleaving. Accordingly, when the number of PLPs including the LLS is greater than 4, the signal processor 120 may firstly process four PLPs among the PLPs including the LLS, and then process the remaining PLPs. In this case, the signal processor 120 processes up to four PLPs simultaneously when processing the remaining PLPs.

For example, it is assumed that 0 cell is required for time de-interleaving the PLP1 through which LLS for the first service is transmitted (i.e., the transmitting apparatus (not shown) has not time-interleaved PLP1), 0 cell is required for time de-interleaving the PLP2 through which the LLS for the second service is transmitted, 0 cell is required for time de-interleaving the PLP3 through which the LLS for the third service is transmitted, $2^{19}$ cells are required for time de-interleaving the PLP 4 through which the LLS for the fourth service is transmitted, and the number of cells in the memory provided in the receiving apparatus 100 is $2^{19}$.

In this case, the number of cells required for time de-interleaving the PLP1 to PLP4 including the LLS for the first to fourth services is smaller than the number of cells of the memory provided in the receiving apparatus 100 and the total number of the PLPs including the LLS is 4. Therefore, the signal processor 120 may simultaneously process PLP1 to PLP4.

As another example, it is assumed that 0 cell is required for time de-interleaving the PLP1 through which LLS for the first service is transmitted, 0 cell is required for time de-interleaving the PLP2 through which the LLS for the second service is transmitted, 0 cell is required for time de-interleaving the PLP3 through which the LLS for the third service is transmitted, $2^{19}$ cells are required for time de-interleaving the PLP4 through which the LLS for the fourth service is transmitted, $2^{19}$ cells are required for time de-interleaving the PLP5 through which the LLS for a fifth service is transmitted, and the number of cells in the memory provided in the receiving apparatus 100 is $2^{19}$.

In this case, the number of cells required for time de-interleaving the PLP1 to PLP5 including the LLS for the first to fifth services is smaller than the number of cells of the memory provided in the receiving apparatus 100. However, there are five PLPs including the LLS, and the receiving apparatus 100 may process up to four PLPs simultaneously. Therefore, the signal processor 120 may simultaneously process PLP1 to PLP4 and then process PLP5, or simultaneously process PLP1 to PLP3 and PLP5, and then process PLP4.

Meanwhile, the signal processor 120 may process the PLP including the LLS by reversely applying the process performed by the transmitting apparatus (not shown). For example, the signal processor 120 may de-interleave and decode data included in the PLP.

Accordingly, the signal processor 120 may obtain the LLS from the PLPs and obtain the SLT included in the LLS. Then, the signal processor 120 may generate a channel map based on the SLT.

Meanwhile, when the calculated number of cells is greater than the predetermined number, the signal processor 120 simultaneously processes the number of PLPs that may be time de-interleaved using a predetermined number of cells among the PLPs including the LLS, after processing the PLPs, and process the remaining PLPs.

That is, when the number of cells in the memory provided for time de-interleaving is smaller than the number of cells required for time de-interleaving all PLPs including the LLS, all the PLPs including the LLS may not be time de-interleaved simultaneously. Accordingly, the signal processor 120 processes the number of PLPs that may be de-interleaved simultaneously, using the cells provided for the time de-interleaving, and then processes the remaining PLPs.

In this case, when processing the remaining PLPs, the signal processor 120 may consider the number of PLPs that may be simultaneously processed, consider the number of cells of the memory required for time de-interleaving and the number of cells required for time de-interleaving the remaining PLPs, and process the remaining PLPs together or divide and process the remaining PLPs into several times.

Meanwhile, as described above, the receiving apparatus 100 may process up to four PLPs simultaneously, thereby time-de-interleaving up to four PLPs simultaneously upon time de-interleaving.

Accordingly, when the number of PLPs including the LLS exceeds four, the signal processor 120 may firstly process the four PLPs among the PLPs including the LLS, and then process the remaining PLPs. In this case, the signal processor 120 may process up to four PLPs simultaneously, even when processing the remaining PLPs.

For example, it is assumed that 0 cell is required for time de-interleaving the PLP1 through which LLS for the first service is transmitted, 0 cell is required for time de-interleaving the PLP2 through which the LLS for the second service is transmitted, $2^{19}$ cells are required for time de-interleaving the PLP3 through which the LLS for the third service is transmitted, $2^{19}$ cells are required for time de-interleaving the PLP4 through which the LLS for the fourth service is transmitted, and the number of cells in the memory provided in the receiving apparatus 100 is $2^{19}$.

In this case, the number of cells required for time de-interleaving the PLP1 to PLP4 including the LLS for the first to fourth services is larger than the number of cells of the memory provided in the receiving apparatus 100.

Accordingly, the signal processor 120 firstly processes some of the PLPs including the LLS, and then processes the remaining PLPs. At this time, considering the number of cells of the memory provided in the receiving apparatus 100, the signal processor 120 may simultaneously process the PLP1 to PLP3, and then process the PLP4, or simultaneously processes the PLP1, PLP2, and PLP4, and then process PLP3.

As another example, it is assumed that 0 cell is required for time de-interleaving the PLP1 through which LLS for the first service is transmitted, 0 cell is required for time de-interleaving the PLP2 through which the LLS for the second service is transmitted, $2^{19}$ cells are required for time de-interleaving the PLP3 through which the LLS for the third service is transmitted, $2^{19}$ cells are required for time de-interleaving the PLP4 through which the LLS for the fourth service is transmitted, 0 cell is required for time de-interleaving the PLP5 through which the LLS for the fifth service is transmitted, and the number of cells in the memory provided in the receiving apparatus 100 is $2^{19}$.

In this case, the number of cells required for time de-interleaving the PLP1 to PLP5 including the LLS for the first to fifth services is larger than the number of cells of the memory provided in the receiving apparatus 100.

Accordingly, the signal processor 120 firstly processes some of the PLPs including the LLS, and then processes the remaining PLPs.

Specifically, the signal processor 120 may simultaneously process PLPs that may be de-interleaved using the $2^{19}$ cells in consideration of the number of cells of the memory provided in the receiving apparatus 100. However, since the receiving apparatus 100 may simultaneously process up to four PLPs, the signal processor 120 may process PLP1 to PLP3 and PLP5 simultaneously and then process PLP4 or may process PLP1, PLP2, PLP4, and PLP5 simultaneously, and then process PLP3.

Meanwhile, the signal processor 120 may process the PLP including the LLS by applying the process of the transmitting apparatus (not shown) reversely. For example, the signal processor 120 may perform de-interleaving and decoding on the PLP.

Accordingly, the signal processor 120 may obtain the LLS from the PLP and obtain the SLT included in the LLS. Then, the signal processor 120 may generate the channel map based on the SLT.

At this time, the signal processor 120 may generate the channel map based on the SLT obtained from the processed PLP, and then process a next PLP to obtain the SLT and generate the channel map based on the obtained SLR.

That is, the signal processor 120 may firstly process the number of PLPs that may be de-interleaved simultaneously using the cells provided for time de-interleaving, obtain the SLT from the corresponding PLP, and generate the channel map based on the obtained SLT. Thereafter, the signal processor 120 may process the remaining PLP to obtain the SLT and generate the channel map based on the obtained SLT.

Meanwhile, when the PLPs including the LLS are completely processed, the signal processor 120 may change an RF frequency to select another channel, receive a frame through the other channel, and repeat the above-described process.

Meanwhile, the SLT includes information (for example, information about the PLP including the SLS) about a position of the SLS. Accordingly, when the signal processor 120 obtains the SLT, the signal processor 120 may obtain the SLS using the information about the position of the SLS included in the SLT. Such a process is referred to as a full scan process, and the SLS may be transmitted to the receiving apparatus 100 through the same PLP as the SLT.

Meanwhile, when a service is processed, i.e., when a PLP including one service among a plurality of services received through a channel is processed, the receiving apparatus 100 may process the PLPs including the LLS using the following method.

First, the signal processor 120 determines whether LLS is present in a frame (i.e., a current frame) received through a channel.

In this case, the signal processor 120 may determine whether the LLS is present in the frame based on a flag (i.e., L1B_lls_flag) included in L1 basic signaling of the frame.

For example, when L1B_lls_flag is 0, the signal processor 120 may determine that the LLS is not present in the frame, and when L1B_lls_flag is 1, may determine that the LLS is present in the frame.

Meanwhile, when the LLS is not present in the frame, the signal processor 120 may sequentially check L1B_lls_flag of frames following the frame to determine the frame in which the LLS is present.

Meanwhile, when the LLS is present in the frame, the signal processor 120 may determine the PLPs including the LLS among the plurality of PLPs included in the frame.

In this case, the signal processor 120 may determine the PLP including the LLS based on a flag (i.e., L1D_plp_lls_flag) included in L1 detail signaling of the frame.

The signal processor 120 may calculate the number of cells required for time de-interleaving the PLP including the LLS.

At this time, the PLP including the LLS may be at least one PLP including LLS for at least one other service transmitted to the receiving apparatus 100 through the same channel as the service currently being processed by the receiving apparatus 100. That is, the signal processor 120 may calculate the number of cells required for time de-interleaving at least one PLP including LLS for the remaining services excluding the service currently being processed among a plurality of services.

In this case, the signal processor 120 may calculate the number of cells required for time de-interleaving the PLP including the LLS based on information related to a time interleaver included in the L1 detail signaling of the frame. At this time, a method of calculating the number of cells varies depending on a time interleaving mode of the transmitting apparatus (not shown), and a detailed description thereof will be described later.

Then, when a value of the sum of the calculated number of cells and the number of cells used for time de-interleaving at least one PLP including one service is less than a predetermined number, and the number of at least one PLP including LLS for remaining services satisfies a predetermined condition, the signal processor 120 may simultaneously process the at least one PLP including the LLS for the remaining services.

However, when the value of the sum of the calculated number of cells and the number of cells used for time de-interleaving at least one PLP including one service is greater than the predetermined number or the number of the at least one PLP including the LLS for the remaining services does not satisfy the predetermined condition, the signal processor 120 may process each of the at least one PLP including the LLS for the remaining services.

Here, the predetermined number may be the number of cells of the memory provided in the receiving apparatus 100 for time de-interleaving.

For example, the maximum value of the predetermined number may be $2^{19}$. This is because, as described above, the receiving apparatus 100 may include a memory including a maximum of $2^{19}$ cells for time de-interleaving.

The predetermined condition may be a condition that the number of the at least one PLP including the LLS for the remaining service is smaller than or equal to a value obtained by subtracting the number of at least one PLP including one service from the number of PLPs that may be simultaneously processed by the receiving apparatus 100.

Specifically, the signal processor 120 may compare the value of the sum of the calculated number of cells and the number of cells used for time de-interleaving the PLP of the service currently being processed with $2^{19}$, and when the value of the sum of the calculated number of cells and the number of cells used for time de-interleaving the PLP of the service currently being processed is less than or equal to $2^{19}$, process all the PLPs including the LLS for the remaining services simultaneously with the service currently being processed.

That is, when the PLP including one service is being processed, some of the cells prepared for time de-interleaving are used for processing the corresponding service.

Therefore, when the signal processor 120 may process all the PLPs including the LLS for the remaining services simultaneously by using a cell that is not currently used, i.e., when the value of the sum of the calculated number of cells and the number of currently used cells is equal to or less than a predetermined number, the signal processor 120 may time de-interleave simultaneously the PLP including the service currently being processed and all the PLPs including the LLS for the remaining services.

However, as described above, the receiving apparatus 100 may process up to four PLPs simultaneously, thereby time de-interleave up to four PLPs simultaneously upon time de-interleaving.

Accordingly, the signal processor 120 may determine whether to process all the PLPs including the LLS for the remaining services together with the PLP including the service currently being processed in consideration of the number of the PLPs including the service currently being processed and the PLPs including the LLS for the remaining services.

For example, it is assumed that the number of PLPs including the service currently being processed is n. Here, $1 \leq N < 4$.

At this time, when a value of the sum of the number of cells used for time de-interleaving the PLP including the service currently being processed and the number of cells used for time de-interleaving all the PLPs including the LLS for the remaining services is less than or equal to $2^{19}$, and when the number of the PLPs including the LLS for the remaining services is less than or equal to 4−n, the signal processor 120 may process all the PLPs including the LLS for the remaining services together with the service currently being processed.

However, when the number of the PLPs including the LLS for the remaining services is greater than 4−n, the signal processor 120 may not process all the PLPs including the LLS for the remaining service together with the service currently being processed.

In this case, the signal processor 120 may process at least one PLP that may be time de-interleaved through a cell not currently used among the PLPs including the LLS for the remaining services together with the PLP including the service currently being processed.

In this case, since the receiving apparatus 100 may process up to four PLPs simultaneously, the signal processor 120 may process up to 4−n PLPs among the PLPs including the LLS for the remaining services together with the PLP including the service currently being processed.

For example, it is assumed that the signal processor 120 processes PLP0 and PLP1 through which the first service is transmitted and uses $2^{16}$ cells for time de-interleaving PLP0 and PLP1.

At this time, it is assumed that $2^{16}$ cells are required for time de-interleaving PLP2 through which the LLS for the second service is transmitted, 0 cell is required for time de-interleaving PLP3 through which the LLS for the third service is transmitted, and the number of cells of the memory provided in the receiving apparatus 100 is $2^{19}$.

In this case, the value of the sum of the number of PLPs including the first service currently being processed and the number of PLPs including the LLS for the second and third services is 4 or less. The number of currently unused cells among the $2^{19}$ cells of the memory for time de-interleaving is greater than the number of cells required for time de-interleaving the PLP2 including the LLS for the second service and the PLP3 including the LLS for the third service. Accordingly, the signal processor 120 processes PLP0 to PLP3 simultaneously.

As another example, it is assumed that the signal processor 120 processes PLP0 and PLP1 through which the first service is transmitted and uses $2^{18}$ cells for time de-interleaving PLP0 and PLP1.

At this time, it is assumed that $2^{18}$ cells are required for time de-interleaving PLP2 through which the LLS for the second service is transmitted, 0 cell is required for time de-interleaving PLP3 through which the LLS for the third service is transmitted, $2^{18}$ cells are required for time de-interleaving PLP4 through which the LLS for the fourth service is transmitted, and the number of cells of the memory provided in the receiving apparatus 100 is $2^{19}$.

In this case, a value of the sum of the number of PLPs including the first service currently being processed and the number of PLPs including LLS for the second to fourth services is 5, which is greater than 4 that is the number of PLPS that may be processed by the receiving apparatus 100. Further, upon time de-interleaving, the number of cells required for time de-interleaving PLP2 to PLP4 including the LLS for the second to fourth services is greater than the number of currently unused cells (i.e., $2^{19}-2^{18}<2^{18}+0+2^{18}$).

Accordingly, the signal processor 120 may process PLP0 and PLP1 including the first service and PLP2 and PLP3 through which the LLS for the second and third services is transmitted together. Then, the signal processor 120 may process PLP0 and PLP1 including the first service and PLP4 through which the LLS for the fourth service is transmitted together.

Alternatively, the signal processor 120 may process PLP0 and PLP1 including the first service and PLP3 and PLP4 through which the LLS for the third and fourth services is transmitted together. Thereafter, the signal processor 120 may process PLP0 and PLP1 including the first service and PLP2 through which the LLS for the second service is transmitted together.

Alternatively, the signal processor 120 may process the PLP0 and PLP1 including the first service and PLP2 including the LLS for the second service together. Thereafter, the signal processor 120 may process PLP0 and PLP1 including the first service and PLP3 including the LLS for the third service together. Thereafter, the signal processor 120 may process PLP0 and PLP1 including the first service and PLP4 including the LLS for the fourth service together.

Meanwhile, in these cases, the signal processor 120 may process the PLP including the LLS by applying a process processed by the transmitting apparatus (not shown) reversely. For example, the signal processor 120 may perform de-interleaving and decoding on the PLP.

Accordingly, the signal processor 120 may obtain the LLS from the PLP and obtain the SLT included in the LLS. The signal processor 120 may monitor the SLT for the service currently being processed and the remaining services and may generate or update a channel map accordingly.

Meanwhile, hereinafter, a method of calculating the memory size will be described in detail.

First, the signal processor 120 determines a time interleaving mode.

Specifically, the signal processor 120 may determine the time interleaving mode for the PLP based on L1D_plp_TI_mode included in L1 detail signaling of a frame. Here, L1D_plp_TI_mode is a field indicating the time interleaving mode for the PLP (in this regard, the ATSC 3.0 standard defines the following in relation to L1D_plp_TI_mode: L1D_plp_TI_mode: This field shall indicate the time interleaving mode for the PLP).

For example, in the case of the PLP where L1D_plp_TI_mode=00, the signal processor 120 may determine that the time interleaving mode for the PLP is a no time interleaving mode, in the case of the PLP where L1D_plp_TI_mode=01, determine that the time interleaving for the PLP is a CTI mode, and in the case of the PLP where L1D_plp_TI_mode=10, determine that the time interleaving mode for the PLP is a HTI mode.

Thereafter, the signal processor 120 may calculate a size of memory required for time de-interleaving the PLP according to the time interleaving mode.

First, in the no time interleaving mode, since time interleaving is not performed on the PLP, the signal processor 120 may calculate the number of cells required for time de-interleaving the PLP corresponding to the no time interleaving mode as 0.

Meanwhile, in the CTI mode, the signal processor 120 may calculate the number of cells required for time de-interleaving the PLP for each PLP, based on L1D_plp_CTI_depth included in the L1 detail signaling.

Here, L1D_plp_CTI_depth is a field indicating the number of rows used in a convolutional time interleaver (in this regard, the ATSC 3.0 standard defines L1D_plp_CTI_depth as: L1D_plp_CTI_depth: This field shall indicate the number of rows used in the Convolutional Time Interleaver).

At this time, the number of rows according to a value of L1D_plp_CTI_depth is shown in Table 1 below.

TABLE 1

| Value | Number of Rows |
|---|---|
| 000 | 512 |
| 001 | 724 |
| 010 | 887 (non-extended interleaving) or 1254 (extended interleaving) |
| 011 | 1024 (non-extended interleaving) or 1448 (extended interleaving) |
| 100 | Reserved for future use |
| 101 | Reserved for future use |
| 110 | Reserved for future use |
| 111 | Reserved for future use |

In this case, the signal processor 120 may calculate the number $M_{CTI}$ of cells required for time de-interleaving the PLP based on the following Equation 1.

$$M_{CTI}=N_{rows} \times N_{columns}/2 \qquad \text{[Equation 1]}$$

$N_{rows}$ denotes the number of rows and $N_{columns}=N_{rows}-1$.

That is, the signal processor 120 may determine the number of rows based on the value of 1D_plp_CTI_depth, calculate the number $N_{columns}$ of columns based on the number $N_{rows}$ of rows, and calculate the number $M_{CTI}$ of cells required for time de-interleaving the PLP by substituting $N_{rows}$ and $N_{columns}$ into Equation 1.

As a result, according to the value of L1D_plp_CTI_depth, the number $M_{CTI}$ of cells required for time de-interleaving the PLP may be expressed as shown in Table 2 below.

TABLE 2

| Value | Number of Rows | TI memory size |
| --- | --- | --- |
| 000 | 512 | 130816 |
| 001 | 724 | 261726 |
| 010 | 887 (non-extended interleaving) or 1254 (extended interleaving) | 392941 (non-extended interleaving) or 785631 (extended interleaving) |
| 011 | 1024 (non-extended interleaving) or 1448 (extended interleaving) | 523776 (non-extended interleaving) or 1047628 (extended interleaving) |
| 100 | Reserved for future use | — |
| 101 | Reserved for future use | — |
| 110 | Reserved for future use | — |
| 111 | Reserved for future use | — |

Meanwhile, in the HTI mode, the signal processor 120 may calculate the number of cells required for time de-interleaving the PLP based on information included in the L1 detail signaling.

In this case, the information used for calculating the number of cells required for time de-interleaving the PLP may be L1D_plp_HTI_inter_subframe, L1D_plp_HTI_num_ti_blocks, L1D_plp_HTI_num_fec_blocks_max, L1D_plp_HTI_num_fec_blocks, L1D_plp_mod, L1D_plp_fec_type included in the L1 detail signaling.

Here, L1D_plp_HTI_inter_subframe indicates a hybrid time interleaving mode. That is, L1D_plp_HTI_inter_subframe=0 indicates that inter-subframe interleaving is not used (i.e., intra-subframe interleaving is used), and L1D_plp_HTI_inter_subframe=1 indicates that inter-subframe interleaving is used together with one TI block per interleaving frame spread over multiple subframes.

(In this regard, the ATSC 3.0 standard defines the following for L1D_plp_HTI_inter_subframe: L1D_plp_HTI_inter_subframe: This field shall indicate the hybrid time interleaving mode. L1D_plp_HTI_inter_subframe=0 shall indicate that inter-subframe interleaving is not used (i.e. only intra-subframe interleaving is used). L1D_TI_inter_frame=1 shall indicate that inter-subframe interleaving is used with one TI block per interleaving frame spread over multiple subframes).

Also, L1D_plp_HTI_num_ti_blocks represents the number $N_{TI}$ of TI blocks per interleaving frame when L1D_plp_HTI_inter_subframe=0, or the number $N_{IU}$ of subframes in which cells from one TI block are transmitted when L1D_plp_HTI_inter_subframe=1. A value represented by L1D_plp_HTI_num_ti_blocks may be one less than actual value of $N_{TI}$ or $N_{IU}$ to allow a range of 1 to 16 to be signaled.

(In this regard, the ATSC 3.0 standard defines the following for L1D_plp_HTI_num_ti_blocks: L1D_plp_HTI_num_ti_blocks: This field shall indicate either the number of TI blocks per interleaving frame, $N_{TI}$, when L1D_plp_HTI_inter_subframe=0 or the number of subframes, $N_{IU}$, over which cells from one TI block are carried when L1D_plp_HTI_inter_subframe=1. The value indicated by L1D_plp_HTI_num_ti_blocks shall be one less than the actual value of $N_{TI}$ or $N_{IU}$ to permit a range from 1 to 16 to be signaled).

Also, L1D_plp_HTI_num_fec_blocks_max represents a value one less than the maximum number of FEC blocks per interleaving frame for the current PLP.

(In this regard, the ATSC 3.0 standard defines the following for L1D_plp_HTI_num_fec_blocks_max: L1D_plp_HTI_num_fec_blocks_max: This field shall indicate one less than the maximum number of FEC blocks per interleaving frame for the current PLP).

Also, L1D_plp_HTI_num_fec_blocks represents a value one less than the number of FEC blocks included in the current interleaving frame for the current PLP.

(In this regard, the ATSC 3.0 standard defines the following for L1D_plp_HTI_num_fec_blocks: L1D_plp_HTI_num_fec_blocks: This field shall indicate one less than the number of FEC blocks contained in the current interleaving frame for the current PLP).

Also, L1D_plp_mod represents the modulation used for the current PLP.

(In this regard, the ATSC 3.0 standard defines the following for L1D_plp_mod: L1D_plp_mod: This field shall indicate the modulation used for the current PLP).

Also, L1D_plp_fec_type indicates the FEC method used for encoding the current PLP. (In this regard, the ATSC 3.0 standard defines the following for L1D_plp_fec_type: L1D_plp_fec_type: This field shall indicate the Forward Error Correction (FEC) method used for encoding the current PLP).

Here, the FEC block refers to a FEC frame after being mapped to a cell, and the FEC frame refers to one baseband packet to which FEC parity bits are added and may be composed of 64800 bits or 16200 bits per FEC frame. Also, the TI block may be composed of at least one FEC block.

Meanwhile, a detailed description in this regard is defined in the ATSC 3.0 standard, and thus the detailed description will be omitted.

First, when L1D_plp_HTI_inter_subframe=0, the signal processor 120 may calculate the number of cells required for time de-interleaving the PLP for each PLP according to the value of L1D_plp_HTI_num_ti_blocks.

Specifically, when L1D_Plp_HTI_num_ti_blocks=0, the signal processor 120 may calculate $N_{TI}=1$ and the number $M_{HTI}$ of cells required for time de-interleaving the PLP based on Equation 2 below.

$$M_{HTI}=N_r \times N_{FEC\_TI} \quad \text{[Equation 2]}$$

Here, $N_r$ denotes the number of cells of one FEC block. In this case, the signal processor 120 may calculate $N_r$ through L1D_plp_mod and L1D_plp_fec_type. For example, it is assumed that the PLP is modulated using a 16-QAM method based on the value of L1D_plp_mod and the PLP has a code length of 64,800 based on the value of L1D_plp_fec_type. In this case, the signal processor 120 may calculate $N_r=64800/4=16200$.

Also, $N_{FEC\_TI}$ denotes the number of FEC blocks included in the current interleaving frame for the current PLP, and the signal processor 120 may calculate $N_{FEC\_TI}$ based on a value of L1D_plp_HTI_num_fec_blocks.

Meanwhile, when L1D_plp_HTI_num_ti_blocks=1, the signal processor 120 may calculate $N_{T1}=N$ and the number $M_{HTI}$ of cells required for time de-interleaving the PLP for each PLP based on Equation 3 below.

$$M_{HTI}=N_r \times N_{FEC\_TI\_MAX} \quad \text{[Equation 3]}$$

Here, $N_r$ denotes the number of cells of one FEC block. Also, $N_{FEC\_TI\_MAX}$ denotes the maximum number of FEC blocks per current interleaving frame for the current PLP, and the signal processor 120 may calculate $N_{FEC\_TI\_MAX}$ based on a value of L1D_plp_HTI_num_fec_blocks_max.

Meanwhile, when L1D_plp_HTI_inter_subframe=1, the signal processor 120 may calculate the number $M_{HTI}$ of cells required for time de-interleaving the PLP for each PLP according to a value of L1D_plp_HTI_num_ti_blocks, based on Equation 4 below.

$$M_{HTI}=N_r+0.5\times N_{FEC\_TI\_MAX}\times(2N_r+(L_{IU}+1)N_{large}$$
$$(N_{large}-1))+L_{IU}(N_{IU}(N_{IU}-1)-N_{large}(N_{large}-1)))$$ [Equation 4]

Here, $N_r$ denotes the number of cells of one FEC block. $N_{FEC\_TI\_MAX}$ denotes the maximum number of FEC blocks per current interleaving frame for the current PLP, and the signal processor 120 may calculate $N_{FEC\_TI\_MAX}$ based on a value of L1D_plp_HTI_num_fec_blocks_max.

Also, $L_{IU}$=floor($N_r/N_{IU}$), where floor(x) is the largest integer less than or equal to x. When a value of L1D_plp_HTI_inter_subframe is 1, the $N_{IU}$ may be the number of subframes in which cells of one TI block are carried. Also, $N_{large}=N_r$ mod $N_{IU}$.

As described above, the signal processor 120 may calculate the number of cells required for de-interleaving the PLP according to the time interleaving mode.

Meanwhile, the signal processor 120 may process a PLP including EAS and ESG in consideration of the number of cells required for time de-interleaving the PLP including the LLS and the maximum number of PLPs that may be processed.

For example, it is assumed that data for providing each service is processed through the following PLP.

Figure 10:
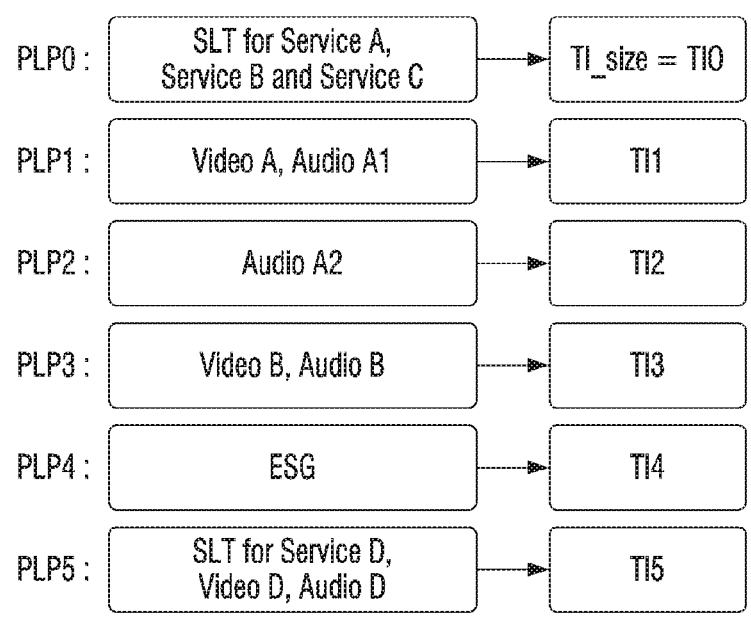
FIG. 10 is a diagram for explaining a PLP processing method of a receiving apparatus according to an exemplary embodiment of the present disclosure.

Service A: SLT (PLP0), Video A and Audio A1 (PLP1), Audio A2 (PLP2) for service A Service B: SLT (PLP0), Audio A2 (PLP2), Video B and Audio B1 (PLP3) for service B, where Audio A2 may be used with service A Service C: SLT (PLP0), ESG (PLP4) for service C service D: SLT, video D and Audio D (PLP5) for service D It is assumed that the number of cells required for time de-interleaving the PLP of each service is as shown in FIG. 10.

In this case, the receiving apparatus 100 may perform various functions in consideration of the maximum number of PLPs that may be processed and the number of cells required for time de-interleaving PLPs.

First, the receiving apparatus 100 may process a broadcast service.

Specifically, when TI0+TI1+TI2 is less than or equal to $2^{19}$, the receiving apparatus 100 may process the PLP including the service A and provide the broadcast service for the service A to a user. In this case, since PLP0 includes not only the service A to be provided to the user but also SLTs for the services B and C, the receiving apparatus 100 may process PLP0 to obtain the SLTs for the services B and C.

Also, when TI0+TI1+TI2 is less than or equal to $2^{19}$, the receiving apparatus 100 may process the PLP including the service B and provide the broadcast service for the service B to the user. In this case, since PLP0 includes not only the service B to be provided to the user but also SLTs for the services A and C, the receiving apparatus 100 may process PLP0 to obtain the SLTs for the services A and C.

Also, when TI5 is less than or equal to $2^{19}$, the receiving apparatus 100 may process the PLP including the service D and provide the broadcast service for the service D to the user.

Also, the receiving apparatus 100 may process the broadcast service and the ESG.

Specifically, when TI0+TI1+TI2+TI4 is less than or equal to $2^{19}$, the receiving apparatus 100 may process the PLP including the service A to provide the broadcast service for the service A to the user, and process the PLP including the ESG to obtain information for a program guide. In this case, since PLP0 includes not only the service A to be provided to the user but also the SLTs for the services B and C, the receiving apparatus 100 may process PLP0 to obtain the SLTs for the services B and C.

When TI0+TI1+TI2+TI4 is less than or equal to $2^{19}$, the receiving apparatus 100 may process the PLP including the service B to provide the broadcast service for the service B to the user, and process the PLP including the ESG to obtain the information for the program guide. In this case, since PLP0 includes not only the service B to be provided to the user but also the SLTs for the services A and C, the receiving apparatus 100 may process PLP0 to obtain the SLTs for the services A and C.

When TI4+TI5 is less than or equal to $2^{19}$, the receiving apparatus 100 may process the PLP including the service D to provide the broadcast service for the service D to the user, and process the PLP including the ESG to obtain the information for the program guide.

The receiving apparatus 100 may also process SLTs for the broadcast service and other services.

Specifically, when TI0+TI1+TI2+TI5 is less than or equal to $2^{19}$, the receiving apparatus 100 may process the PLP including the service A to provide the broadcast service for the service A to the user, and process the PLP including a SLT for the service D to obtain the SLT for the service D. In this case, since PLP0 includes not only the service A to be provided to the user but also the SLTs for the services B and C, the receiving apparatus 100 may process PLP0 to obtain the SLTs for the services B and C.

When TI0+TI1+TI2+TI5 is less than or equal to $2^{19}$, the receiving apparatus 100 may process the PLP including the service B to provide the broadcast service for the service B to the user, and process the PLP including the SLT for the service D to obtain the SLT for the service D. In this case, since PLP0 includes not only the service B to be provided to the user but also the SLTs for the services A and C, the receiving apparatus 100 may process PLP0 to obtain the SLTs for the services A and C.

When TI0+TI5 is less than or equal to $2^{19}$, the receiving apparatus 100 may process the PLP including the service D to provide the broadcast service for the service D to the user, and process PLPs including the SLTs for the services A, B, and C to obtain the SLTs for the services A, B, and C.

The receiving apparatus 100 may also monitor the SLTs for the broadcast service, the ESG, and other services.

Specifically, when TI0+TI4+TI5 is less than or equal to $2^{19}$, the receiving apparatus 100 may process the PLP including the service D to provide the broadcast service for the service D to the user, process the PLP including the ESG to obtain the information for the program guide, and process the PLPs including the SLTs for services A, B, and C to obtain the SLTs for services A, B, and C.

However, the receiving apparatus 100 may not process the SLTs for the service A, the ESG, and the service D together. This is because that since the PLPs including the service A are PLP0, PLP1, and PLP2, the PLP including the ESG is PLP4, and the PLP including the SLT for the service D is PLP5, the sum of the number of these PLPs is 5, which exceeds 4 that is the maximum number of PLPs that may be processed by the receiving apparatus 100.

Also, the receiving apparatus 100 may not process the SLTs for the service B, the ESG, and the service D together. This is because that since the PLPs including the service B are PLP0, PLP2, and PLP3, the PLP including the ESG is PLP4, and the PLP including the SLT for the service D is PLP5, the sum of the number of these PLPs is 5, which exceeds 4 that is the maximum number of PLPs that may be processed by the receiving apparatus 100.

Meanwhile, the above-described signal processor 120 may include a demodulation chip (not shown) and a main system-on-chip (SoC) chip (not shown) according to an implementation example.

Figure 11A:
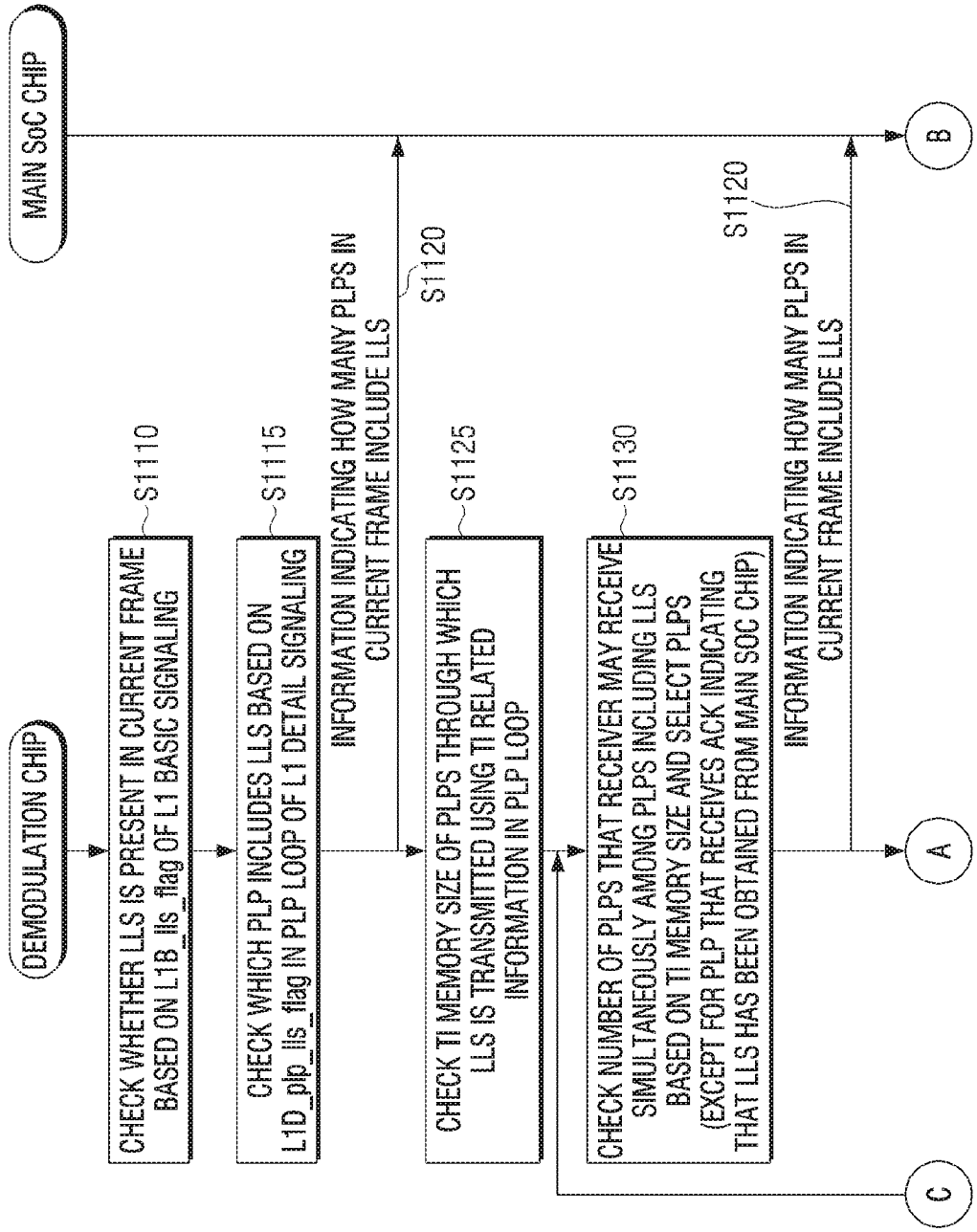
FIG. 11 is a flowchart for explaining a PLP processing method of a receiving apparatus according to an exemplary embodiment of the present disclosure.
Figure 11B:
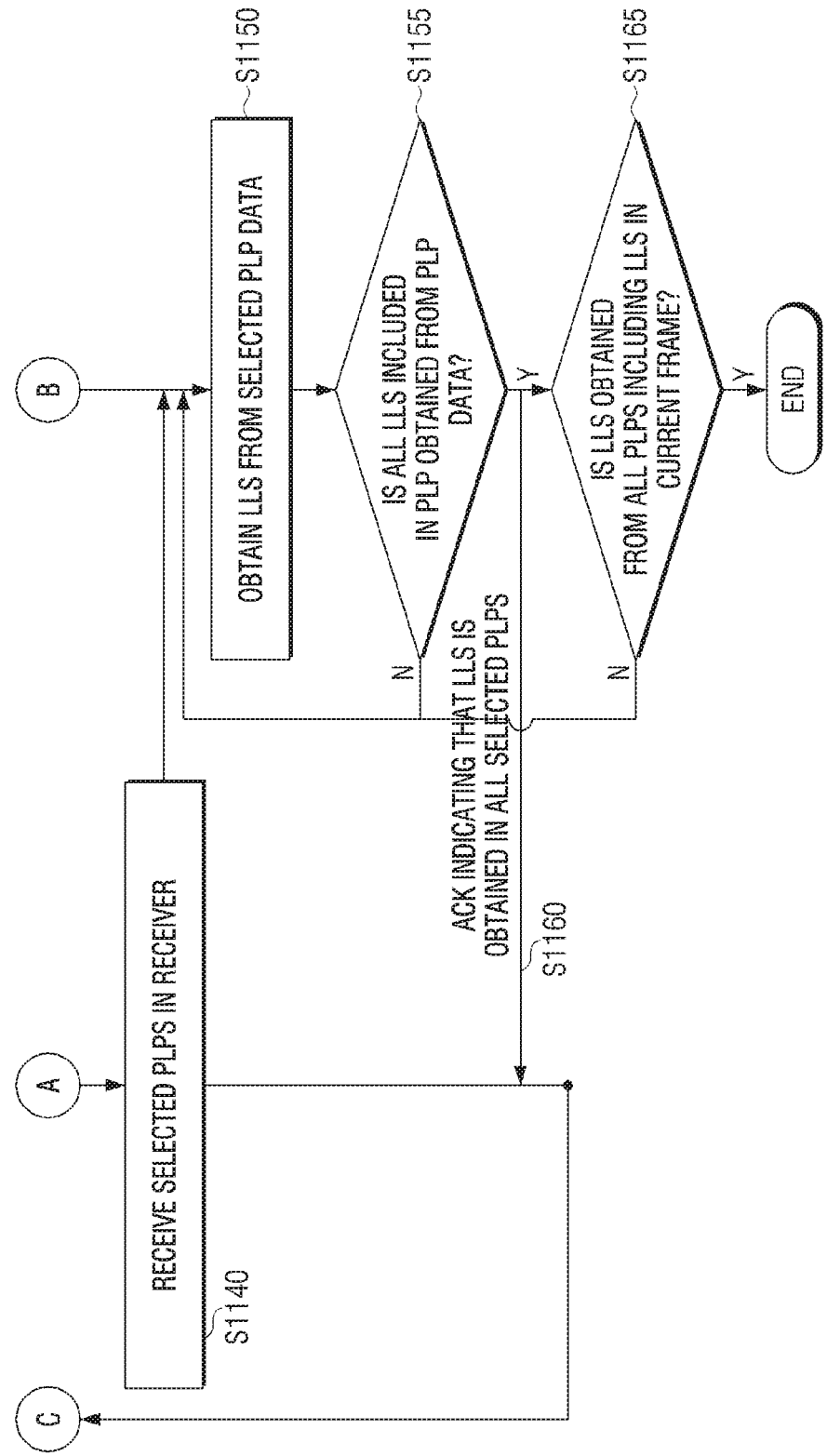

In this case, a communication protocol between the demodulation chip (not shown) and the main SoC chip (not shown) may be represented as shown in FIG. 11a and FIG. 11b.

Here, the demodulation chip (not shown) and the main SoC chip (not shown) may commonly or separately manage an ID (i.e., LLS_PLP_ID) of a PLP through which LLS is transmitted, an ID (i.e., opened_PLP_ID) of a PLP processed by the demodulation chip (not shown) and provided to the main SoC chip (not shown), and an ID (i.e., scanned_PLP_ID) of a PLP of LLS completely obtained by scanning PLP data in the main SoC chip (not shown) and exchange information about these IDs.

First, the demodulation chip (not shown) may check whether the LLS is present in a current frame based on a value of L1B_lls_flag of L1 basic signaling (S1110).

Then, the demodulation chip (not shown) may check which PLP includes the LLS based on L1D_plp_lls_flag in a PLP loop of L1 detail signaling (S1115). That is, the demodulation chip (not shown) may check the ID of the PLP including the LLS.

Thereafter, the demodulation chip (not shown) may provide the main SoC chip (not shown) with information indicating how many PLPs in the current frame include the LLS (S1120). At this time, the demodulation chip (not shown) may further provide the ID of the PLP including the LLS to the main SoC chip (not shown).

Then, the demodulation chip (not shown) may check the TI memory size of the PLPs through which the LLS is transmitted using TI (time de-interleaver) related information in the PLP loop (S1125). Here, the TI memory size may be regarded as the memory size required for time de-interleaving the PLPs since the memory size required for time de-interleaving is the same as the memory size used for time interleaving. That is, the demodulation chip (not shown) may use the TI related information to check the number of cells required for time de-interleaving the PLPs including the LLS.

Thereafter, the demodulation chip (not shown) may check the number of PLPs that the receiving apparatus 100 may receive simultaneously among the PLPs including the LLS based on the TI memory size and select PLPs as many as the checked number (S1130). In this case, the demodulation chip (not shown) may additionally consider the maximum number of PLPs that may be processed to determine the number of PLPs that may be simultaneously received.

Accordingly, the demodulation chip (not shown) may select all the PLPs including the LLS or select some of all the PLPs including in the LLS.

Meanwhile, when selecting a PLP, the demodulation chip (not shown) may select the PLP from remaining PLPs from the PLPs including the LLS, except for a PLP that receives an ACK indicating that the LLS has been obtained from the main SoC chip (not shown).

Thereafter, the demodulation chip (not shown) may provide information about the number of the selected PLPs to the main SoC chip (not shown) (S1135).

Then, the demodulation chip (not shown) receives the selected PLPs (S1140). That is, the demodulation chip (not shown) may de-interleave and decode data transmitted through the selected PLPs to obtain PLP data from the selected PLPs. In this case, the demodulation chip (not shown) may provide IDs of the processed PLPs to the main SoC chip (not shown).

Then, the demodulation chip (not shown) provides the obtained PLP data to the main SoC chip (not shown) (S1145). The main SoC chip (not shown) obtains LLS from the PLP data provided from the demodulation chip (not shown) (S1150).

In this case, the main SoC chip (not shown) may provide an ID of a PLP including the obtained LLS to the demodulation chip (not shown).

Thereafter, the main SoC chip (not shown) determines whether all LLS is obtained from the PLP data (S1155). At this time, the main SoC chip (not shown) may compare the ID of the PLP processed by the demodulation chip (not shown) with the ID of the PLP including the LLS obtained by the main SoC chip (not shown) and determine whether all the LLS is obtained from the PLP data.

When the main SoC chip (not shown) fails to obtain all the LLS from the PLP data (S1155-N), the main SoC chip obtains the LLS again from the PLP data.

However, when the main SoC chip (not shown) obtains all the LLS from the PLP data (S1155-Y), the main SoC chip (not shown) may provide an ACK indicating that the LLS is obtained in all the selected PLPs to the demodulation chip (not shown) (S1160). In this case, the main SoC chip (not shown) may provide the ID of the PLP including the obtained LLS to the demodulation chip (not shown).

When there is a PLP that may not be selected due to the restriction on the TI memory size and the maximum number of PLPs that may be processed in step S1130, the demodulation chip (not shown) may select the PLP and perform the above-described process again.

At this time, the demodulation chip (not shown) may select a PLP that has not yet been processed among the PLPs including the LLS based on the ID of the PLP received from the main SoC chip (not shown).

In this case, the demodulation chip (not shown) also selects a PLP that has not yet been processed among the PLPs included in the current frame, considering the TI memory size and the maximum number of PLPs that may be processed.

Meanwhile, when the main SoC chip (not shown) obtains all the transmitted LLS from the PLP data (S1155-Y), the main SoC chip (not shown) may determine whether the LLS has been obtained from all the PLPs including the LLS in the current frame (S1165), and thus, when the LLS is obtained from all the PLPs including the LLS in the current frame, may complete a processing operation on the LLS.

Meanwhile, in the above example, the main SoC chip (not shown) may provide the PLP ID for the PLP including the obtained LLS to the demodulation chip (not shown).

At this time, the main SoC chip (not shown) may individually provide an IDs of a PLP to the demodulation chip (not shown) each time the LLS is obtained from the PLP, or if all the LLS is obtained and when the LLS is obtained from all the PLPs provided from the demodulation chip (not shown), may integrally provide the LLS.

Meanwhile, according to the ATSC 3.0 standard, a transmitting apparatus (not shown) may use a time interleaver memory of the same size for each subframe in a frame upon time interleaving, or use time interleaver memory of different sizes for each frame in the frame.

Specifically, when using convolutional time interleaving (i.e., L1D_plp_TI_mode=01) or using inter-subframe interleaving in a hybrid time interleaving mode (i.e., L1D_plp_TI_mode=10 and L1D_plp_HTI_inter_subframe=0), the transmitting apparatus (not shown) may use a time interleaver memory of the same size for each subframe.

When using intra-subframe interleaving in the hybrid time interleaving mode (when L1D_plp_TI_mode=10 and L1D_plp_HTI_inter_subframe=1), the transmitting apparatus (not shown) may use time interleaver memory of different sizes for each subframe.

As described above, when memory having different sizes is used for each subframe, the signal processor 120 may process a PLP for each subframe.

For example, it is assumed that a frame is composed of four subframes, PLP1 is included in a first subframe, PLP2 is included in a second subframe, PLP1 is included in a third subframe, and PLP2 is included in a fourth subframe. It is assumed that PLP1 or PLP2 may be processed according to the size of memory required for time de-interleaving and the restriction condition on the number of PLPs that may be processed.

In this case, when the PLP is processed for each frame, the signal processor 120 processes PLP1, and after processing for the PLP1 is completed, thereafter processes PLP2. However, when processing the PLP for each subframe, the signal processor 120 may process PLP1 included in the first subframe, process PLP2 included in the second subframe, process PLP1 included in the third subframe, and process PLP2 included in the fourth subframe.

In this case, the signal processor 120 may calculate the size of memory required for time de-interleaving of the PLP for each subframe, calculate the size of memory required for time de-interleaving of the PLP by setting the largest value of the calculated memory size as a representative value, and compare the calculated size of memory with the available size of memory to determine whether to time de-interleave the PLP.

When a plurality of PLPs including the LLS are present in a subframe, the signal processor 120 may determine whether to de-interleave all the PLPs including the LLS for each subframe and determine whether to process all the PLPs including the LLS together. At this time, even when all the PLPs may not be de-interleaved and only some of the PLPs are processed, the PLP must satisfy a currently available size of the memory for time de-interleaving for each subframe.

Meanwhile, it is described in the above-described example that the receiving apparatus 100 may use a maximum number of $2^{19}$ cells for time de-interleaving and process up to four PLPs simultaneously. However, this is only an example, and the number of cells for time de-interleaving may be more than $2^{19}$, and the number of PLPs that may be processed simultaneously may be more or less than four. In this case, the receiving apparatus 100 may process the PLP including the LLS in consideration of this.

Figure 12:
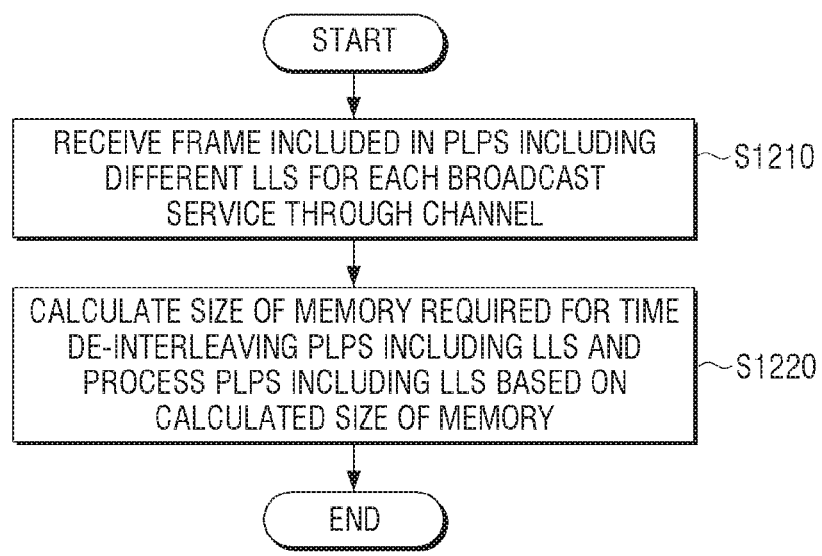
FIG. 12 is a flowchart for explaining a PLP processing method of a receiving apparatus according to an exemplary embodiment of the present disclosure.

FIG. 12 is a flowchart illustrating a PLP processing method of a receiving apparatus according to an exemplary embodiment of the present disclosure.

First, a frame included in PLPs including different LLS for each broadcast service is received through a channel (S1210).

Then, a size of memory required for time de-interleaving the PLPs including the LLS is calculated, and the PLPs including the LLS are processed based on the calculated size of the memory (S1220).

Specifically, in step S1220, the size of memory required for time de-interleaving a first PLP including LLS for a first broadcast service and a second PLP including LLS for a second broadcast service is calculated, the calculated size of memory is compared with a size of memory provided in the receiving apparatus for time de-interleaving, and the first PLP and the second PLP may be processed based on a comparison result.

In this case, in step S1220, when the calculated size of memory is smaller than the size of memory provided in the receiving apparatus, the first PLP and the second PLP are processed simultaneously, and when the calculated size of memory is larger than the size of memory provided in the receiving apparatus, the first PLP and the second PLP may be separately processed.

Meanwhile, in step S1220, the number of cells required for time de-interleaving the PLPs including the LLS may be calculated at the time of channel scanning.

If the calculated number of cells is equal to or less than a predetermined number, all the PLPs including the LLS may be processed simultaneously. When the calculated number of cells is larger than the predetermined number, the number of PLPs that may be time de-interleaved among the PLPs including the LLS may be processed simultaneously by using a predetermined number of cells, and after processing the PLPs, the remaining PLPs may be processed.

Here, the predetermined number may be the number of cells of memory provided in the receiving apparatus for time de-interleaving.

Meanwhile, in step S1220, in a state where at least one PLP including one service among a plurality of services received through a channel is being processed, the number of cells required for time interleaving at least one PLP including LLS for the remaining services may be calculated.

When the sum of the calculated number of cells and the number of cells used for time de-interleaving the at least one PLP including one service is equal to or less than a predetermined number and the at least one PLP including LLS for the remaining services satisfies a predetermined condition, the at least one PLP including LLS for the remaining services may be simultaneously processed.

When the sum of the calculated number of cells and the number of cells used for time de-interleaving the at least one PLP including one service is greater than the predetermined number and the at least one PLP including LLS for the remaining services does not satisfy the predetermined condition, the at least one PLP including LLS for the remaining services may be separately processed.

Here, the predetermined number is the number of cells of memory provided in the receiving apparatus for time de-interleaving, and the predetermined condition is that the number of the at least one PLP including LLS for the remaining services is less than or equal to a value obtained by subtracting the number of the at least one PLP including one service from the number of PLPs that may be simultaneously processed in the receiving apparatus.

Meanwhile, a non-transitory computer readable medium storing a program sequentially executing the PLP processing method according to the present disclosure may be provided.

[01] The non-transitory computer readable medium is not a medium storing data for a short time such as a register, a cache, a memory, etc., but means a medium that semi-permanently stores data and may be read by a device. Specifically, the above-mentioned various applications or programs may be stored and provided in the non-transitory computer readable medium such as CD, DVD, hard disk, Blu-ray disk, USB, memory card, ROM, and the like.

Also, although a bus is not shown in the above-described block diagram for the receiving apparatus, communication between the respective components in the receiving apparatus may be performed via the bus. Also, the receiving apparatus may further include a processor such as a CPU, a microprocessor, or the like that performs the various operations described above, and each device may further include memory for performing the various operations described above.

Further, the components, modules, units, and the like in the exemplary embodiments of the present disclosure may be implemented by hardware, firmware, or software for performing at least one function or operation, or a combination thereof. For example, they may have integrated circuit structures such as memory, processing logic, look-up tables, etc., that may perform each function through control of at least one microprocessor or other control device. They may also be implemented by a program or code that includes at least one instruction executable to perform a particular logic function. They may also include a processor, such as a CPU, microprocessor, for performing the respective functions. They may also be implemented as at least one processor (not shown) integrated into at least one module or chip, except where each needs to be implemented as a separate, specific piece of hardware.

While the present disclosure has been particularly shown and described with reference to the exemplary embodiments thereof, the present disclosure is not limited to the above-mentioned specific exemplary embodiments, but may be variously modified by those skilled in the art to which the present disclosure pertains without departing from the spirit and scope of the present disclosure as claimed in the claims. Such modifications should also be understood to fall within the scope of the present disclosure.

The invention claimed is:

1. A receiving apparatus for receiving a plurality of broadcast services, the receiving apparatus comprising:
   a receiver configured to receive, through a channel, a frame comprising a first Physical Layer Pipe (PLP) and a second PLP, the first PLP including a Low Level Signaling (LLS) a first broadcast service and the second PLP including a LLS for a second broadcast service; and
   a signal processor configured to:
   calculate a size of a required memory that is required for time de-interleaving the first PLP and the second PLP,
   compare the calculated size of the required memory with a size of a provided memory that is provided in the receiving apparatus for the time de-interleaving, and
   process the first PLP and the second PLP based on a comparison result.

2. The receiving apparatus as claimed in claim 1, wherein the signal processor is configured to process the first PLP and the second PLP simultaneously when the calculated size of the required memory is smaller than the size of the provided memory.

3. The receiving apparatus as claimed in claim 1, wherein the signal processor is configured to process the first PLP and the second PLP separately when the calculated size of the required memory is greater than the size of the provided memory.

4. The receiving apparatus as claimed in claim 1, wherein the signal processor is configured to calculate a number of cells required for time de-interleaving the PLPs including the LLS during a channel scan.

5. The receiving apparatus of claim 4, wherein the signal processor is configured to simultaneously process all the PLPs including the LLS when the calculated number of the cells is equal to or less than a predetermined number.

6. The receiving apparatus of claim 4, wherein when the calculated number of the cells is greater than a predetermined number, the signal processor is configured to process some PLPs that are capable of being time de-interleaved simultaneously among the PLPs including the LLS using the predetermined number of the cells and process remaining PLPs after processing the some PLPs.

7. The receiving apparatus of claim 5, wherein the predetermined number is a number of the cells provided in the receiving apparatus for time de-interleaving.

8. The receiving apparatus of claim 1, wherein the signal processor is configured to calculate a number of cells required for time interleaving at least one PLP including LLS for remaining services in a state where at least one PLP including one service among a plurality of services received through the channel is processed.

9. The receiving apparatus of claim 8, wherein the signal processor is configured to simultaneously process the at least one PLP including the LLS for the remaining services when a value of a sum of the calculated number of the cells and a number of the cells that are used for time de-interleaving the at least one PLP including the one service is equal to or less than a predetermined number, and when a number of the at least one PLP including the LLS for the remaining services satisfies a predetermined condition.

10. The receiving apparatus of claim 8, wherein the signal processor is configured to separately process the at least one PLP including the LLS for the remaining services when a value of a sum of the calculated number of the cells and a number of the cells that are used for time de-interleaving the at least one PLP including the one service is greater than a predetermined number, and when a number of the at least one PLP including the LLS for the remaining services does not satisfy a predetermined condition.

11. The receiving apparatus of claim 10, wherein the predetermined number is a number of provided cells of the provided memory that is provided in the receiving apparatus for the time de-interleaving, and the predetermined condition is a condition that the number of the at least one PLP including the LLS for the remaining services is equal to or less than a value obtained by subtracting a number of the at least one PLP including the one service from a number of the PLPs that are capable of being simultaneously processed by the receiving apparatus.

12. A method of processing a PLP (Physical Layer Pipe) of a receiving apparatus for receiving a plurality of broadcast services, the method comprising:
   receiving, through a channel, a frame comprising a first Physical Layer Pipe (PLP) and a second PLP, the first PLP including a Low Level Signaling (LLS) for a first broadcast service and the second PLP including a LLS for a second broadcast service;
   calculating a size of a required memory that is required for time de-interleaving the first PLP and the second PLP,
   compare the calculated size of the required memory with a size of a provided memory that is provided in the receiving apparatus for the time de-interleaving, and
   processing the first PLP and the second PLP based on a comparison result.

13. The method as claimed in claim 12, wherein the processing comprises: processing the first PLP and the second PLP simultaneously when the calculated size of the required memory is smaller than the size of the provided memory, and processing the first PLP and the second PLP separately when the calculated size of the required memory is greater than the size of the provided memory.

* * * * *